United States Patent [19]

Kitajima et al.

[11] Patent Number: 4,627,709

[45] Date of Patent: Dec. 9, 1986

[54] AUTOMATIC SHEET FEEDER AND AN IMAGE RECORDING APPARATUS PROVIDED THEREWITH

[75] Inventors: Tadayuki Kitajima, Yokohama; Makoto Kitahara, Tokyo; Koichi Murakami, Yokohama, all of Japan

[73] Assignee: Canon Kabushiki Kaisha, Tokyo, Japan

[21] Appl. No.: 669,245

[22] Filed: Nov. 7, 1984

[30] Foreign Application Priority Data

Nov. 8, 1983 [JP] Japan ............................. 58-209692
Nov. 10, 1983 [JP] Japan ............................. 58-211423

[51] Int. Cl.$^4$ ..................... G03G 15/00; B65H 5/22
[52] U.S. Cl. ........................... 355/14 SH; 355/3 SH; 271/3; 271/4
[58] Field of Search ............. 355/3 SH, 14 SH, 14 C, 355/23, 24; 271/3, 3.1, 4, 8, 9, 65, 225, 256, 264, 265

[56] References Cited

U.S. PATENT DOCUMENTS

| | | | |
|---|---|---|---|
| 3,556,512 | 1/1971 | Fackler | 271/4 |
| 3,804,512 | 4/1974 | Komori et al. | 355/25 |
| 4,018,523 | 4/1977 | Hughes | 355/8 |
| 4,098,551 | 7/1978 | Komori et al. | 355/3 |
| 4,169,674 | 10/1979 | Russel | 355/14 |
| 4,278,344 | 7/1981 | Sahay | 355/23 X |
| 4,456,236 | 6/1984 | Buddendeck | 355/14 SH X |

*Primary Examiner*—Arthur T. Grimley
*Assistant Examiner*—C. Romano
*Attorney, Agent, or Firm*—Fitzpatrick, Cella, Harper & Scinto

[57] ABSTRACT

An automatic sheet feeder for feeding a sheet to a processing station to record the information on the sheet. Also, an image recording apparatus provided with such an automatic sheet feeder. The automatic sheet feeder includes a sheet stacking tray for supporting a stack of sheets, a feeder for feeding one by one the sheets out of the stack, a processing station for effecting a required processing to the surface of the sheet bearing the information to be recorded, which is being advanced by the feeder, and a conveyor for returning the sheet which has passed through the processing station to the stacking tray.

7 Claims, 38 Drawing Figures

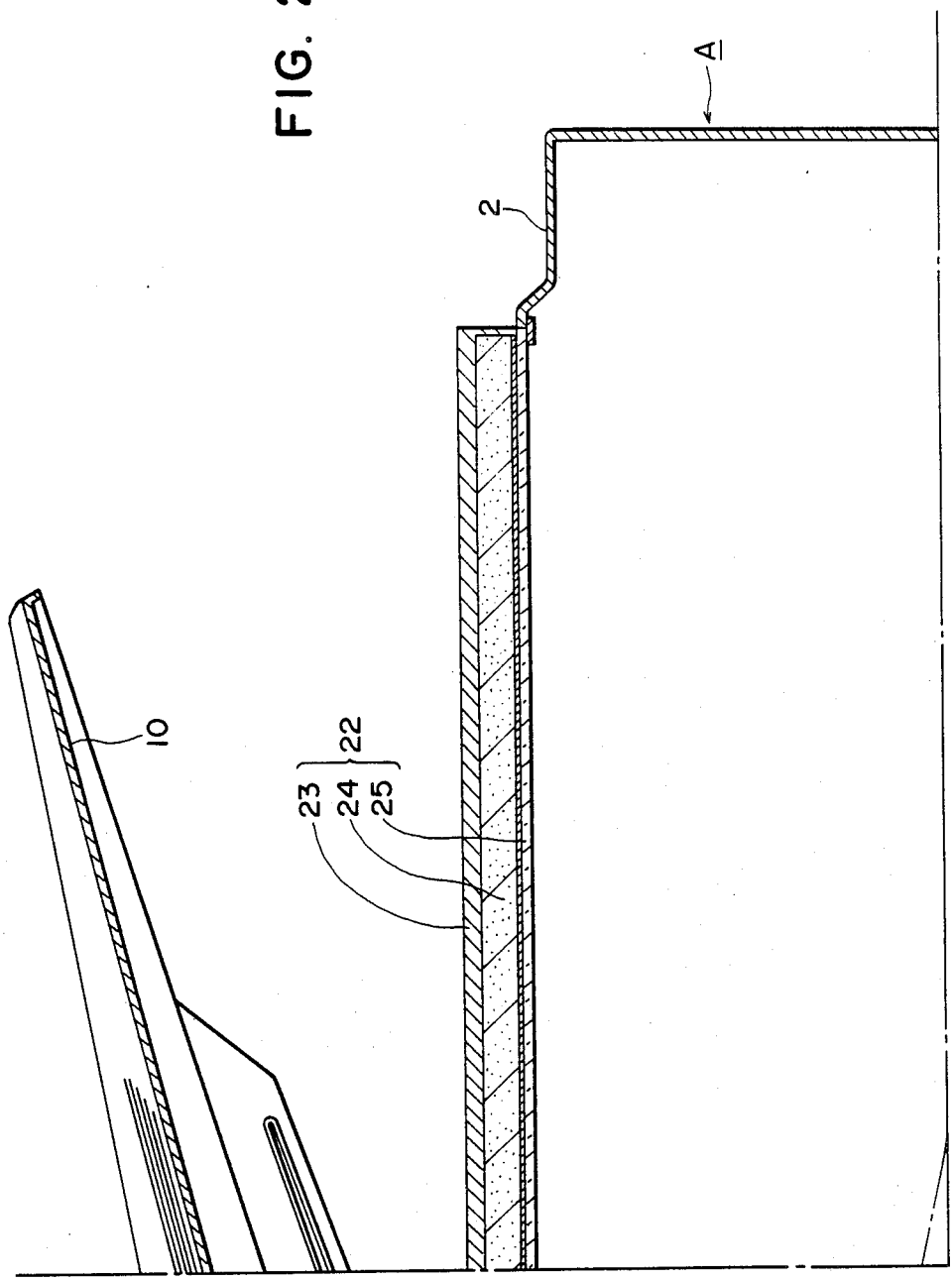

AUTOMATIC SHEET FEEDER AND AN IMAGE RECORDING APPARATUS PROVIDED THEREWITH

BACKGROUND OF THE INVENTION

The present invention relates to an automatic sheet feeder usable with an image recording apparatus, such as an electrophotographic copying machine, a microfilm machine, a facsimile machine and a printing machine, e.g., a laser beam printer and an ink jet printer. More particularly, it relates to an automatic sheet feeder which can process a sheet while it is being advanced. Further, it relates to an image recording apparatus provided with such an automatic sheet feeder. In this invention, the term "sheet" includes a sheet-like member, such as a document and a recording card, having information to be recorded.

As a typical example of a circulation type sheet feeder, there is an automatic sheet document feeding device of a circulation type (RDF) used with an image forming apparatus, such as a copying machine. For the better understanding of the present invention, the document feeder of this type will be explained.

FIG. 1 schematically shows the document feeder B mounted to the top panel 102, having a platen glass 101, of a copying apparatus A.

The document or original feeder B is provided with a tray 110 for stacking sheet originals, which functions as a sheet stack portion. On the tray 110, one set of sheet originals O each having the information to be recorded on its one side, is placed. The originals O are stacked face up on the tray in the order of the page number from the top. In operation, the bottommost original in the stack on the tray 110, upon the copy start instructions, is fed out by a sheet separator mechanism 111 into a first sheet passage 112, and guided to the left hand side of the platen glass 101. Then, the original is guided so as to face down between the platen glass 101 and a flat surface of an endless belt 113 for feeding the original, the flat surface being press-contacted to the top surface of the platen glass 101 and being driven in a forward direction a. The original is driven by the flat surface of the belt 113 so as to slide on the platen glass 101 from the left-hand side to the right-hand side in the Figure. The movement of the belt 113 is stopped at the time when the left hand edge of the original reaches a reference line 101" on the platen glass 101. By this, the original is automatically advanced and set at the predetermined position on the platen glass 101.

When the belt 113 stops, a movable optical system 103 of the copying machine A is driven to optically scan the bottom side of the original stationarily set on the platen glass 101. The scanned image is projected through a slit and imaged onto a surface of a rotatable photosensitive member or drum 109. A copy of the original or document is produced with the cooperation of the other copy process means.

When the scanning operation of the movable optical system 103 for the original on the platen glass 101 completes, the belt 113 is driven in the backward direction b, so that the original on the platen glass 101 which has been copied slides back leftwardly on the platen glass 101 by the backward driving force of the belt 113 and is guided to a second sheet passage 114. Through the sheet passage 114, the original is returned on the tray 110 through the original discharging portion 115 which is located above the sheet separator mechanism 111. The original is discharged onto the topmost original (the first page of the set of originals) of the stacked originals O. At this time, it will be understood that the returned original faces up.

On the other hand, the original on the tray 110 which is then bottommost is introduced to the first sheet passage 112 by the sheet separator mechanismm 111. Before the leading edge of the original reaches the left-hand end of the contact area between the platen glass 101 and the flat surface of the belt 113, the rotation of the belt 113 is switched to the forward movement. The original is advanced rightwardly on the platen glass 101 by the moving flat surface belt 113. Similarly to the previous original, this original is stopped at the predetermined position and is subjected to the optical scanning operation, and then the original is returned by the reverse rotation of the belt 113 until it is discharged.

The above-described process from the feeding to the discharging of the original is effected to the individual originals stacked on the tray 110. When all of the stacked originals are thus circulated once for each, one set of copies of the stacked originals is produced. If the cycle is repeated, a desired number of sets can be obtained. Thus, this system is advantageous in that it can automatically and quickly produce copies of a great number of sheet originals.

The movable optical system 103 of the copying machine A comprises a lamp 104 for illuminating the original, a first movable mirror 105, a second movable mirror 106, an imaging lens 107, a fixed mirror 108 and others. Of these elements, the lamp 104, the first movable mirror 105 and the second movable mirror 106 are normally placed at their home positions in the neighborhood of the left-hand end of the platen glass 101 as viewed in the Figure, as shown by the solid lines in FIG. 1. However, upon the generation of an optical system starting signal, the lamp 104 is energized, and the lamp 104 and the first mirror 105 are advanced at the same speed as the peripheral speed of the photosensitive member 9, while the second mirror 106 is moved at half that speed. Those are moved rightwardly along the bottom surface of the platen glass 101 and are reciprocated. By the movement of the optical elements, the image or information on the bottom surface of the original supported on the platen glas 101 by the circulation type document feeder B, is optically scanned from the left-hand side to the right-hand side. When the lamp 104, the first mirror 105 and the second mirror 106 reach their reversing points as shown in the Figure by the chain lines, the lamp 104 is de-energized, then those elements are reversed to reach the respective home positions and are prepared for the next starting instructions. It is a possible alternative that the optical scanning is effected not during the forward movement of the optical system, but during the returning movement thereof.

As for the sheet separator mechanism 111 for feeding out the sheet originals one by one, various types and mechanisms are usable. The apparatus shown here employs a mechanism comprising in combination a sheet feeding belt 116 moving co-directionally with the sheet original feed and a sheet separating belt 117, disposed above said sheet feeding belt 116, which moves counter-directionally with the sheet feed. Detailed explanations as to the principle of the sheet separation are omitted for the sake of simplicity, since it is well-known.

The circulation type document feeder B includes an outer casing 118, a roller 119 for driving the belt 113, a turning roller 120 and urging rolls 121 for urging the flat face of the belt 113 onto the platen glass 101 in a proper pressure to increase the feeding force to the original imparted during the forward rotation of the belt 113. The original stacking tray 110 is inclined at an angle of approx. 20 degrees downwardly toward the sheet separator mechanism 111.

The document feeder B is pivotable toward and away from the platen glass 101 by a hinge (not shown) provided at the rear side thereof. When an original which is not suitable for the document feeder, such as a thick original like a book, is to be copied, the entire document feeding device is pivoted away from the platen glass 101, and the original is placed face down on the platen glass 101, whereafter the document feeder B is pivoted toward the original to urge the original toward the platen glass 101 so that the document feeder B functions as an original cover on that occasion.

It is possible that the document feeder B is equipped with a mechanism for reversing and re-introducing the original to the platen glass 101 so as to make it possible to obtain a duplex copy. In order to increase the speed of the copying operation in the copying apparatus equipped with the document feeder B, the following measures, for example, are considered:

(1) As for the document feeder B, the speed of the original movement from the tray 110 to the predetermined position on the platen glass 101 and the speed of the original movement, after the scanning, from the platen glass 101 to the tray 110, are increased as much as possible:

(2) As for the copying machine A, the speed of the movement of the optical system 103 to the home position is increased as much as possible.

Those measurements are, in effect is to reduce the time spent not for the step directly concerned with the actual formation of the image, which is contained in one copying cycle from the start of the original feed from the tray 110 to the discharging of the copy thereof to a copy tray (not shown) of the copying machine A. However, there is a limitation to the increase of the speed as stated in the above item (1) since the increase may result in a damage to the originals. As for the above item (2), there is a liability of adverse effects to the other parts of the apparatus, since it may result in an increased mechanical load, and therefore, a stopping shock and vibrations.

SUMMARY OF THE INVENTION

Accordingly, it is a principal object of the present invention to provide an automatic sheet feeder which can automatically feed the recording side of a sheet to a processing station for the sheets.

It is another object of the present invention to provide an automatic sheet feeder wherein the sheet which has passed through the processing station is returned to the sheet stack.

It is a further object of the present invention to provide an automatic sheet feeder which can feed the sheets at a high speed.

It is a further object of the present invention to provide an automatic sheet feeder which can feed the sheets with a reduced damage to the sheet.

It is a further object of the present invention to provide an automatic sheet feeder wherein the mechanical load, such as a stopping shock and vibrations can be reduced.

It is a further object of the present invention to provide an automatic sheet feeder which makes it possible to copy or read an original at a high speed.

It is a further object of the present invention to provide a circulation type automatic sheet feeder wherein the bottommost of a stack of sheets is fed to a processing station and then returned onto the top of the stack of the sheets, and this is repeatedly effected.

It is a further object of the present invention to provide an image recording apparatus provided with an automatic sheet feeder achieving one or more of the above-described objects.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 2, 2A, 2B, 2C and 2D are a cross-sectional view of an electrophotographic copying apparatus provided with an automatic document feeder according to an embodiment of the present invention.

FIGS. 2-1, 2-2, 2-3A, 2-3B, 2-4A, 2-4B, 2-5, 2-6, 2-7 and 2-8 illustrate certain states of originals or copy sheets.

FIG. 3 is a cross-sectional side view of a driving mechanism.

FIG. 4 is an enlarged plan view of a mechanism for detecting that an original one cycle of the original feed finishes.

FIG. 5 is an enlarged side view of the mechanism of FIG. 4.

FIG. 6 is a block diagram of a control circuit.

FIGS. 7, 7A and 7B are a flow chart for illustrating the operation.

FIG. 8, 8A and 8B are a cross-sectinal view of an electrophotographic copying apparatus provided with an automatic document feeder according to another embodiment of the present invention.

FIGS. 13, 13A and 13B are a cross-sectional view of an automatic document feeder according to another embodiment of the present invention.

DESCRIPTION OF THE PREFERRED EMBODIMENTS

The preferred embodiments of the present invention will be described in conjunction with the accompanying drawings.

Figure 2:
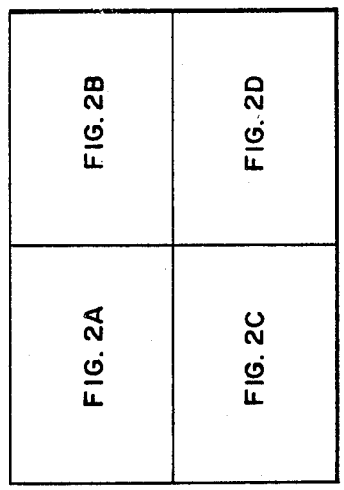
Figure 2A:
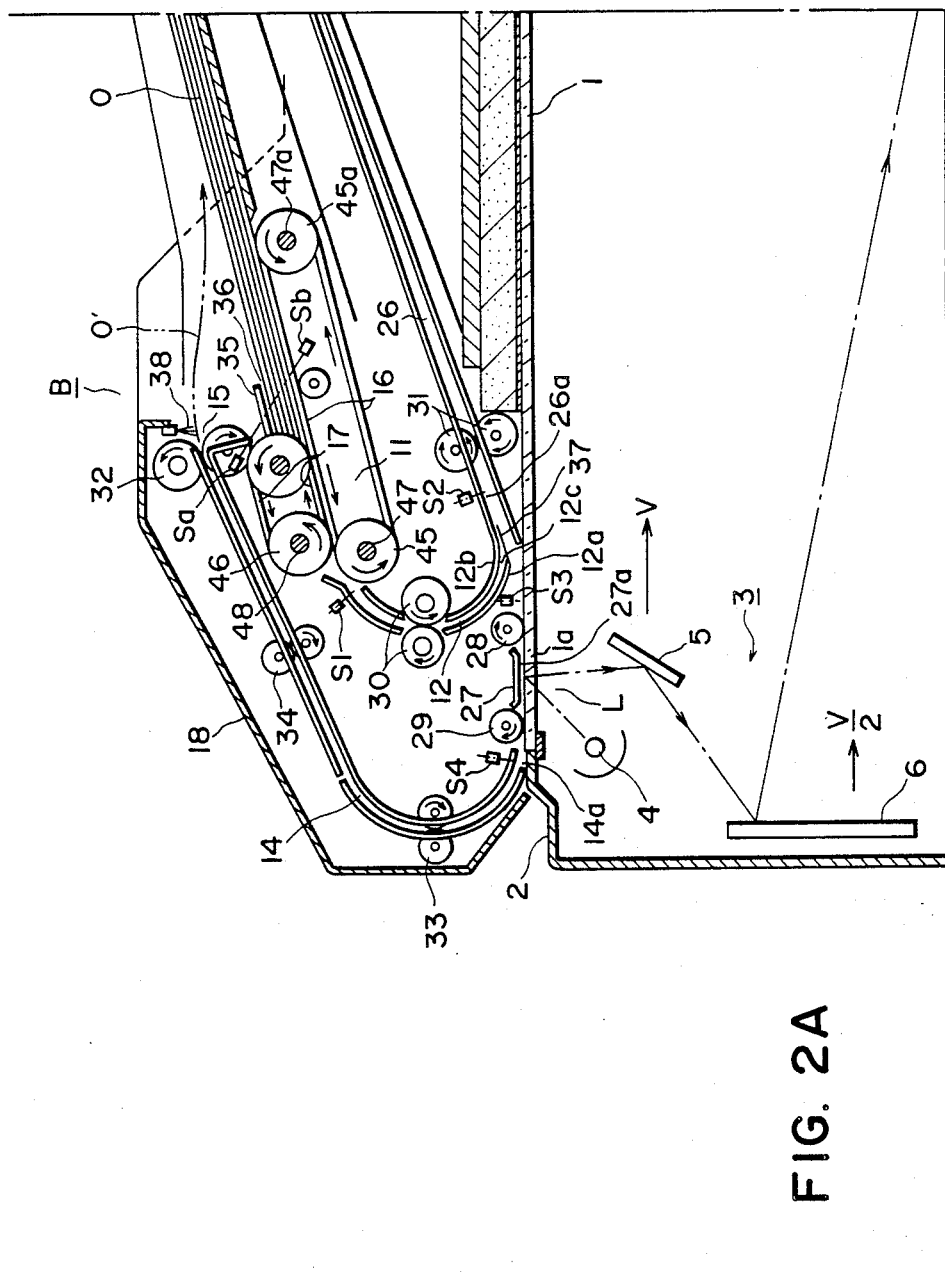
Figure 2C:
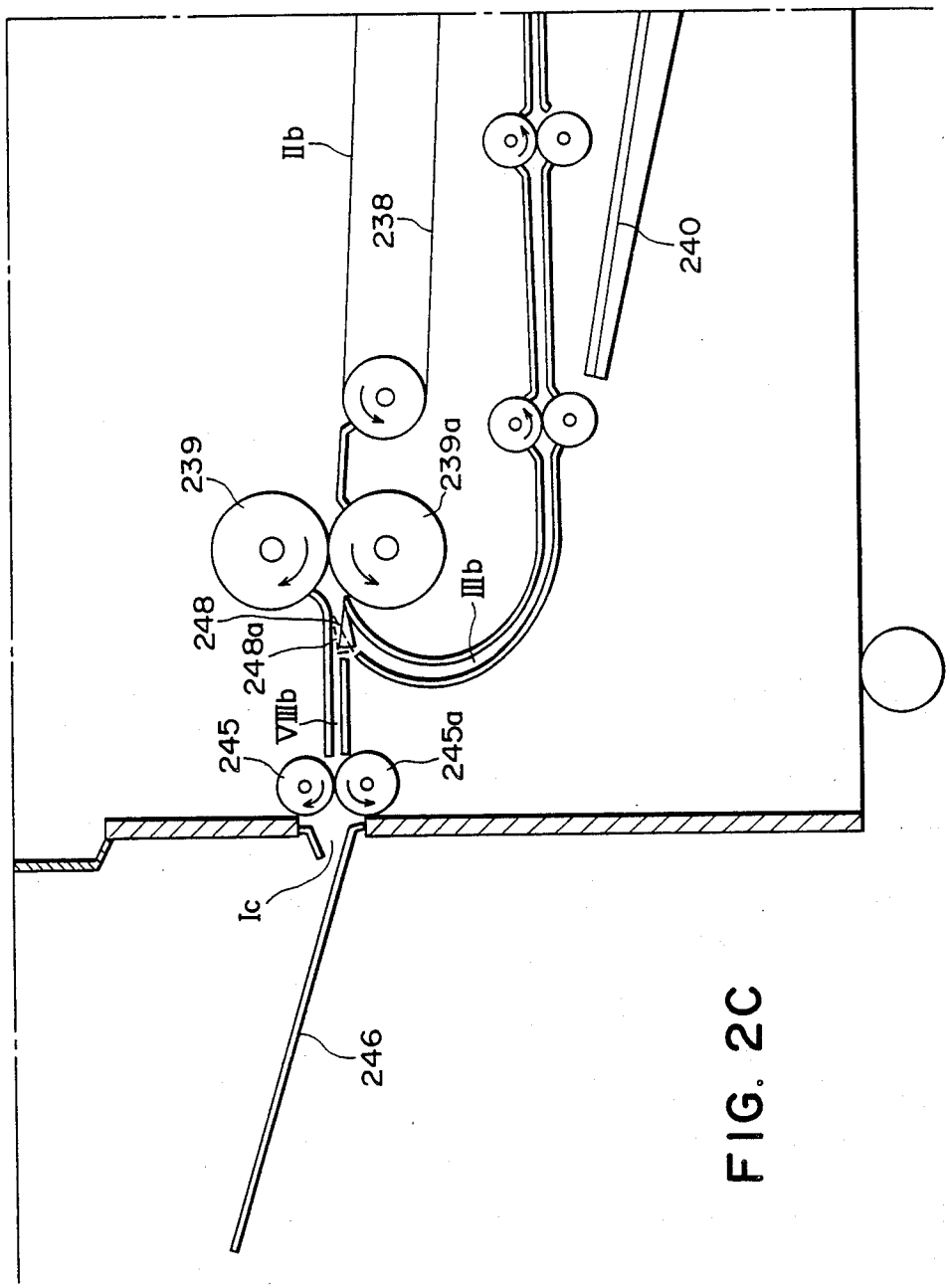
Figure 2D:
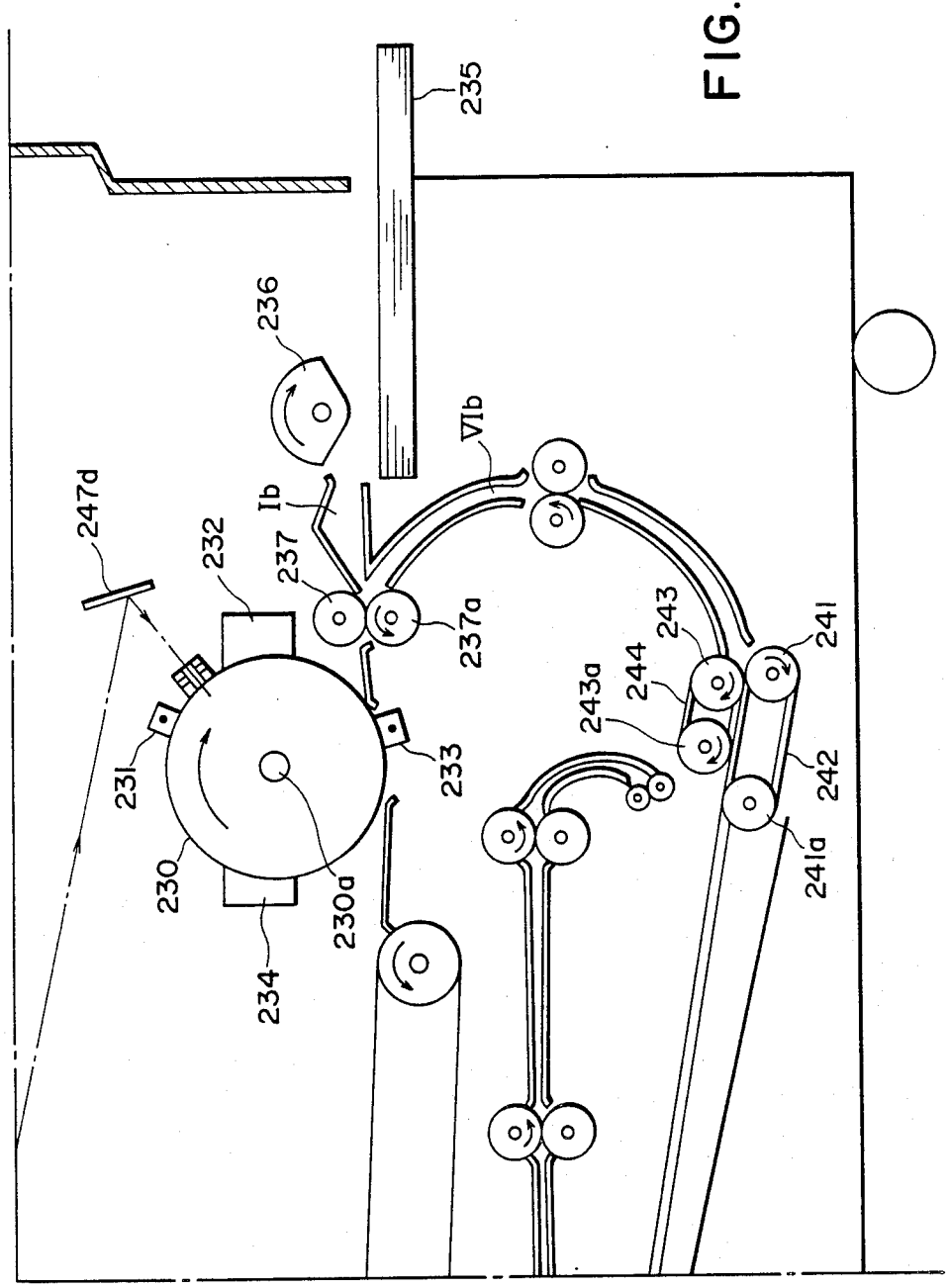
Figures 1, 2:
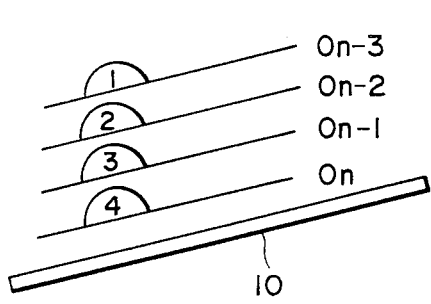
Figure 2:
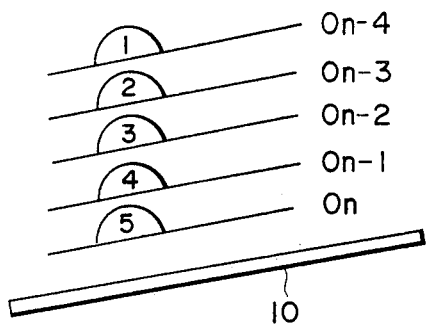
Figures 2, 3, 3A:
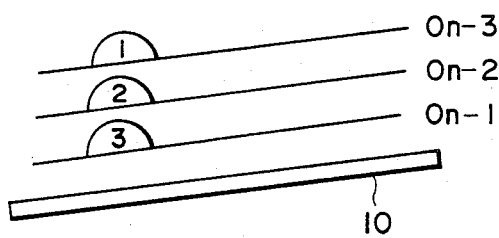
Figures 2, 3, 3B:
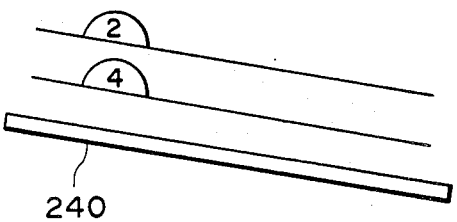
Figures 2, 3, 4, 4A:
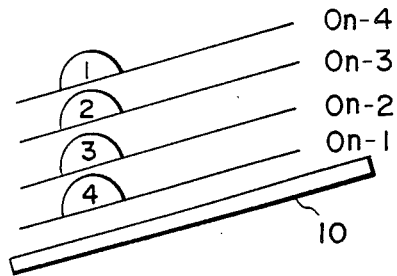
Figures 2, 3, 4, 4B:
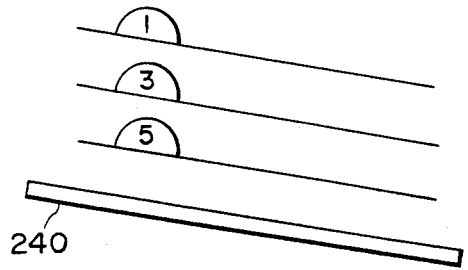
Figures 2, 3, 4, 5:
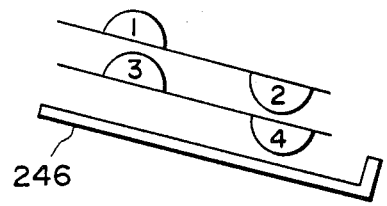

FIGS. 2-7 show the first embodiment of the present invention. Referring now to FIG. 2, there is shown an electrophotographic copying apparatus equipped with the document feeder constructed in accordance with an embodiment of the present invention. FIG. 3 illustrates the driving mechanism. FIG. 4 is an enlarged plan view of the mechanism for detecting the finishing of the one cycle of the original circulation. FIG. 5 is a side view of the mechanism of FIG. 4. The automatic document feeder B, as a whole, is pivotable toward and away from the top surface of the platen glass 1 of the copying apparatus A by a hinge provided at the rear part of the document feeder. The document feeder B is provided with an outer casing.

The feeder B includes an original covering member 22 which covers the top surface of the platen glass 1 when the feeder is pivoted to urge against the top surface of the platen glass 1. As for the original covering member 22, a known member can be used. For example, an outer plate 23 of a hard synthetic resin material may be used, which has a bottom surface to which a cushion layer 24 of sponge is bonded, the cushion layer 24 being relatively thick and being laminated with an Everl sheet 25.

The platen glass 1 is extended leftwardly, in FIG. 2, beyond the left-hand edge of the original covering plate to the neighborhood of the left-hand edge of the top panel 2 so as to form an extension 1a. An original switch-back passage 26 is formed between the original stacking tray 10 and the original covering member 22. The switch-back passage 26 has an original inlet 26a communicated with the outlet 12c of the first sheet passage 12. Therefore, the first sheet passage 12 connects the original stacking tray 10 with the switch-back passage 26.

A reflecting plate 27 is provided to oppose, with a clearance, to the top surface of the extension 1a of the platen glass when the document feeder B is closed to the platen glass 1. First and second original urging rollers 28 and 29 are located before and after the reflecting plate 27. Those rollers are contacted to the extension 1a of the platen glass 1. A second sheet passage 14 has an original inlet 14a located downstream of the second roller 29 with respect to the movement of the document. The other end of the second sheet passage 14 communicates with an original discharging outlet 15 located above the stacking tray 10.

The copying apparatus A includes a movable optical system 3 comprising a lamp 4, a first mirror 5 and a second mirror 6, which are placed below the extension 1a of the platen glass 1. Those are shown as being at their home positions. When the lamp 4 is turned on, while the movable optical system being kept at the home position, the bottom surface of the reflecting plate 27 is illuminated thereby.

The feeder B further includes a couple of original feeding rollers 30 and 30 located adjacent a halfway point of the first sheet passage 12, a couple of reversible rollers 31 and 31 for switching back the original located in the switching-back passage 26 nearer to the connection with the first sheet passage 12, a couple of original discharging rollers 32 and 32 disposed at the original discharging portion 15 of the second sheet passage 14 and two pairs of relaying rollers 33 and 33, 34 and 34 disposed in the second sheet passage 14.

The feeder B is provided with various sensors. Each of sensors Sa and Sb is of a transparent type and is effective to detect whether or not an original is present on the stacking tray 10. First - fourth sheet sensors S1, S2, S3 and S4 of a reflection type are disposed at proper positions for detecting the reaching and passing of the original. The first sensor is disposed at the original inlet of the first sheet passage 12: the second sensor is disposed before the reversible rollers 31 in the original switching-back passage 26: the third sensor is disposed before the first original urging roller 28: and the fourth sensor is disposed at the original inlet 14a of the second sheet passage 14.

Designated by the reference numeral 35 is a pivotable arm of a mechanism for detecting the completion of the one cycle of the originals, and reference 36 is a dividing plate supported on the arm. This mechanism will be described in detail hereinafter in conjuntion with FIGS. 4 and 5.

Adjacent to the original outlet of the first sheet passage 12, there is provided an original deflector 37, which is effective to smoothly guiding the original from the first sheet passage 12 to the switch-back passage 26 and is also effective to direct with certainty the original from the switch-back passage 26 to the first original urging roller 28 without allowing it to reverse to the first sheet passage 12. The deflector 37 is made of a flexible and resilient synthetic resin sheet, such as polyethylene terephthalate (trade name: Myler). The rear end thereof is fixedly bonded to the bottom guiding plate 12a constituting a first sheet passage 12 and, the front end thereof is contacted to the inner surface of the top guiding plate 12b. The original or document from the first sheet passage 12 wedges into the nip formed by the deflector 37 and the top guiding plate 12b and passes through the nip into the switch-back passage 26. On the other hand, the outgoing original from the switch-back passage 26 is prevented from going back to the first sheet passage 12 by the deflector 37, so that the original is sure to be directed to the first original pressing roller 28.

At the original discharging portion 15 of the second sheet passage 14, there are provided discharging needles 38. The original is more or less electrically charged by friction during the transportation. The discharging needles 38 are effective to electrically discharge the original returning through the discharging portion 15 to the original stacking tray 10, so as to smoothly stack the returned originals on the tray 10.

The driving mechanisms, shown in FIG. 3, for the feeder B of FIG. 2 are concentrated at the rear side of the feeder B. They contain a first motor M1 and a second motor M2.

To a rotational shaft of the first motor M1, a driving pulley 39 is fixedly secured. A first belt B1 is entrained around the driving pulley 39, an intermediate pulley 40 and a pulley 41 fixedly secured to the shaft of one of the original discharging rollers 32 and 32. A second belt 32 is entrained around the intermediate pulley 40 and a pulley 42 fixed to a shaft of one of the original transporting rollers 30 disposed in the first sheet passage 12. Therefore, the original discharging rollers 32 and 32 and the original transporting rollers 30 and 30 are Rdriven forwardly, simultaneously with the start of the first motor M1 rotation.

The sheet separator mechanism 11 is provided with a driving roller 45 for driving the sheet feeding belt. To a shaft 47 of the driving roller 45, a gear 43 is fixed. To a shaft 48 of a driving roller 46 for driving the sheet separation belt, a gear 44 is fixed. A driving force is transmitted from the intermediate pulley 40 to the two gears 43 and 44 through an electromagnetic clutch 49. When the electromagnetic clutch is energized during the first motor M1 rotating, the sheet feeding belt 16 is rotated in the sheet feeding direction, while the sheet separating belt 17 is rotated in the opposite direction. When the clutch 49 is de-energized, the rotation of the belts 16 and 17 stops.

A gear 50 is fixedly secured to one of shafts of the reversible rollers 31 in the sheet switch-back passage 26. To the gear 50, a rotational driving force is transmitted from the first motor M1 through an electromagnetic clutch 51 for selectively transmitting the driving force in the forward direction and in the backward direction. When the electromagnetic clutch 51 is energized to take its forward driving position during the first motor M1 rotating, the pair of rollers 31 are rotated in the forward direction, that is, the direction for advancing the original into the switch-back passage 26. When the clutch 51 takes the backward position (de-energized), the rollers 31 are rotated in the reverse direction, that is, the direction for discharging the original from the passage 26.

A third belt B3 is entrained around a driving pulley 52 fixedly secured to the rotational shaft of the second motor M2 and around the pulleys 53 and 54 fixed to the shafts of the first and second original pressing rollers 28 and 29, respectively. A fourth belt B4 is entrained around the driving pulley 52, a pulley 55 fixed to the shaft of one of the relaying rollers 33 in the second sheet passage 14 and a pulley 56 fixed to the shaft of one of the other relaying rollers 34 and 34. Therefore, the second motor M2 can drive, by its rotation, the first and second pressing rollers 28 and 29 and two pairs of the relaying rollers 33 and 33, 34 and 34 in their forward directions.

FIGS. 4 and 5 illustrate a mechanism for detecting the completion of one circulation or cycle of the originals. A driven roller 46a is provided so as to be driven by the driving roller 46 of the sheet separation belt 17. The driven roller 46a is provided with a shaft 46b. A cover 48a, which has bearings for supporting the shaft 46b of the driven roller 46a, is effective to cover the top side of the sheet separation belt. The front and rear end portions of the driven roller shaft 46b are rotatably supported by front and rear vertical walls 47a and 47a, and their ends are projected out through the vertical walls 47a and 47a. Associated with the projected portions of the shafts, there are provided a couple of partition plate rotating mechanisms at the front and rear sides, respectively. The two rotating mechanisms are of the same construction, and therefore, one of them will be described. A gear 60 is fixed to an end of the driven shaft 46b extended out through the wall. A pin 61, which is parallel with the driven shaft 46b, is planted into the outside of the wall 47a adjacent to the end thereof near the driven shaft supporting part. A driven gear 62 is rotatably fitted to the pin 61 and is meshed with the gear 60. To the pin 61, a base portion of a rotatable arm 35 is rotatably mounted and so supported that the arm is normally urged to a side surface of the driven gear 62 through a friction plate 64. The rotatable arm 35 receives a rotational force in the clockwise direction in FIG. 5 about the pin 61 from the roller 46a driven by the sheet separating belt 17 through the shaft 46b, the gear 60, the driven gear 62 and a friction plate 64.

Adjacent to a front end of the arm 35, a partition plate 36 is rotatably supported on a shaft 66. A spring 67 is streched between pins 68 and 69 planted into the front end portion of the arm 35 and the partition plate 36, respectively. By this, the partition plate 36 can click by the force of the spring 67 with the dead point of the shaft 66 position, so that it can takes a first position in which it extends perpendicularly to the arm 35 as shown in FIG. 4 in solid lines and a second position in which it is substantially superposed with the arm 35 as shown in the same Figure by the chain lines.

The arm 35 normally takes its home position in which it extends substantially upwardly, as shown in FIG. 5 by chain lines, and it is in this position when the sheet separating mechanism 11 is not operated. At this time, the partition plate 36 mounted adjacent the front end of the arm 35 takes its first position in which it extends perpendicularly to the arm 35.

When the documents or originals O are placed on the original stacking tray 10, and a copy start button (not shown) is depressed, the sheet feeding belt 16 and the separating belt 17 of the sheet separating mechanism 11 starts to rotate. In response to the start of the separation belt rotation, the arm 35 clockwisely rotates about the pin 61 from its vertical home position. When it rotates through about 90 degrees, the bottom surface of the partition plate 36 is received by the topmost surface of the stack of originals on the tray 10 (FIG. 5). This prevents the further rotation of the arm 35, but the separation belt 17 continues rotating because of the slipping action between the side surface of the driven gear 62 and the side base surface of the arm 36 through the friction plate 64. Since the arm 35 continues to receive the clockwise rotational force about the pin 61 by the slipping action at the friction plate 64, the stacked originals are pressed toward the top surface of the sheet feeding belt 16 by the partition plate 36. This pressing action of the partition plate 36 to the stacked originals O ensures that the bottommost original of the stacked originals is alone fed out by the cooperation of the sheet feeding belt 16 and the sheet separating belt 17. There is provided a roller 70 which receives the pressure given by the partition plate 36 through the sheet feeding belt 16. Because of this, the pressure imparted by the partition plate 36 to the original toward the belt 16, is increased.

The originals stacked on the tray 10 are sequentially fed out one by one, until the bottommost original on which the partition plate 36 is directly pressed is fed out. When the trailing edge of the last original passes under the partition plate 36, the bottom surface of the partition plate 36 is directly pressed on the top surface of the sheet feeding belt 16. Therefore, the partition plate 36 now receives a rotational force about the shaft 66 in the direction shown by an arrow E, in FIG. 4, from the belt 16 which continues rotating. This rotational force rotates the partition plate 36 so that the partition plate 36 takes the second position shown by chain lines in FIG. 4, with the result that the partition plate 36 becomes not associated with the belt 16. Then, the arm 35 rotates about the shaft 61 in the direction shown by an arrow G in FIG. 5 by the continuing rotation of the sheet separating belt 17. During the rotational movement of the arm 35, it crosses a sensor optical path at the position of a photoelectric sensor 71. By this, it is sensed that all of the stacked originals O on the tray 10 have been circulated. Also, by the moving contact of the cam portion 36a of the collapsed partition plate 36 to a fixed member 72, the partition plate 36 again assumes the first position wherein it is opened or away from the arm 35. When the arm 35 rotates to its home position (chain lines in FIG. 5) wherein it extends vertically, the sheet separating mechanism 11, more particularly, the sheet feeding belt 16 and the sheet separating belt 17, stop so as to prepare for the next operation.

Designated by reference numeral 45a is a driven roller to be driven by the sheet feeding belt driving roller 45. The roller 45a is supported by a roller shaft 47a.

Here, an explanation will be made with respect to the main part A of the copying machine provided with the document feeder B. In this embodiment, the copying machine is capable of making a duplex-copies, although, the present invention is not limited to such a case.

The copying machine includes a platen glass 1, a photosensitive drum 230 rotatable in the direction shown by the arrow about a shaft 230a, an electric charger 231, a developing device 232, a transfer corona discharger 233 and a cleaning device 234. The machine is provided with a cassette 235 for accommodating copy sheets, a feeding-out roller 236 for feeding the copy sheets out one by one from the cassette 235, registering rollers 237 and 237a, image fixing devices 239 and 239a, a transportation belt for transporting a copy sheet onto which an image has been transferred to the fixing devices 239 and 239a. The machine further includes an intermediate tray 240 for temporally storing a simplex copy sheet, that is, the copy sheet having only one side on which the copy image is formed, a driving shaft 241 for the feeding belt 242, a shaft 241a to be driven by the feeding belt 242, a driving shaft 243 for driving the separation belt 244 and a shaft 243a to be driven by the separation belt 244. The copy sheets once stored on the intermediate tray 40 are fed out at the bottom thereof. The machine further includes discharging rollers 245 and 245a to discharge copy sheets, on which the images have been copied, to a discharging tray 246 or to a sorter (not shown), if provided.

In this embodiment, that surface of the original which is passing on the extension 1a of the platen glass, is illuminated by the lamp 4, so that the image light formed by the reflection is projected through a slit onto a photosensitive drum 230. Before the image projection, the photosensitive drum 230 is uniformly charged by a corona charger 231. The photosensitive drum thus charged is exposed to the image light through the optical system 3 so that an electrostatic latent image is formed. The electrostatic latent image thus formed on the photosensitive drum 230 is then developed or visualized by the developing device 232. On the other hand, the sheet P in the cassette 235 is fed to the photosensitive drum 230 through a feeding roller 236 and registering rollers 237 and 237a which start rotating in such a timing that the sheet P is aligned with the image developed on the photosensitive drum 230. Then, the toner image on the photosensitive drum 230 is transferred onto the sheet P by the transfer corona discharger 233. Then, the sheet P is separated from the photosensitive drum 230 and is conveyed along a sheet pass IIb to the fixing devices 239 and 239a, where the toner image on the sheet P is fixed. Finally, the sheet P is discharged to the tray 246 through the discharging roller 245 and 245a.

Next, the general operation of the apparatus will be described.

(1) The originals O to be processed are placed face up on the original stacking tray 10. By this, the optical path between the sensor elements Sa and Sb is blocked, so that the presence of the originals is detected. The operator sets on a control panel (not shown), an automatic original feeding mode using the document feeder B, the number of copies to take, copying magnification and the other necessary copying conditions. Then, the operator depresses the copy start button.

(2) The first motor M1 of the driving mechanism (FIG. 3) first starts operating so as to rotate the sheet feeding rollers 30 in the first sheet passage 12 and the original discharging rollers 32 at the original outlet 15 of the second sheet passage 14. Further, the electromagnetic clutch 45 is energized, and the clutch 50 is kept in the forward driving position. Therefore, the sheet feeding belt 16 and the sheet separation belt 17 of the sheet feeding mechanism 11 start rotating, and simultaneously, the pair of rollers 31 in the switch-back passage 26 is rotated in the forward direction. At this stage, the moving optical path 3 of the copying machine A is at its home position, while the lamp 4 is turned on.

(3) In synchronism with the start of rotation of the sheet separating belt 17 in the sheet feeding mechanism 11, the partition plate 36 is moved from its upright position in the clockwise direction to press the stack of originals O on the tray 10.

(4) The bottommost of the stacked originals O on the tray 10 is separated and fed by the cooperation of the sheet feeding belt 16 and the sheet separating belt 17.

(5) The original singled out by the mechanism 11 is guided to the first sheet passage 12, is relayed by the couple of feeding rollers 30 and then introduced into the switch-back passage 26. The original is relayed by the couple of rollers 31 which are rotating in the forward direction, and is taken into the switch-back passage 26 so that the image bearing surface thereof faces downwardly. The original feeding speed of the pair of rollers 30 and 31 are set to be about twice as much as the sheet feeding speed of the mechanism 11.

(6) When the first sheet sensor S1 detects the trailing edge of the original, the electromagnetic clutch 49 is disengaged, with the result that the operation of the sheet feeding mechanism 11 is once stopped.

(7) When the second sheet sensor S2 detects the trailing edge of the original, the clutch 50 is switched to and kept at the backward rotation state so that the couple of rollers 31 in the switch-back passage is reversed. The reversed rotation of the rollers 31 feeds reversely the original in the passes 26 toward the first original pressing roller 28 (switch-back feeding).

(8) The leading edge of the original thus switched back toward the first original pressing roller 28, passes by the third sheet sensor S3 and stopped by the nip formed between the platen glass extension 1a and the first original pressing roller 28, which rests at this time. The first original pressing roller 28, together with the second original pressing roller 29 and the relaying rollers 33 and 34 in the second sheet passage 14, starts rotating by the second motor M2 of the driving mechanism with the time delay preset by a timer from the detection of the leading edge of the original by the third sheet sensor S3. By one stopping the leading edge of the original by the roller 28 in this manner, the feeding of the original is synchronized with the sheet feeding at the side of the copying machine A.

(9) When the first original pressing roller 28 starts rotating, the original is introduced into the clearance 27a formed between the reflecting plate 27 and the top face of the platen glass extension 1a, while being pressed on the platen glass extension 1a. The original is then pressed by the second original pressing roller 29. Thus, the original is moved with its surface press contacted on the top surface of the platen glass extension 1a by the rollers 28 and 29. Hereinafter, the area between the first and second original pressing rollers 28 and 29 will be called an "original illuminating station" L. The portion of the original which has passed through the original illuminating station L is introduced into the second sheet passage 14 and sequentially relayed by the couples 33 and 34 of the relaying rollers, and is advanced toward the original discharging outlet 15. The speed, at which the original is advanced by the first and second original pressing rollers 28 and 29 and the pairs 33 and 34 of the relaying rollers, is set in synchronism with the peripheral speed of the photosensitive member 230 of the copying machine A.

(10) During the original passing through the original illuminating station L, the information bearing surface (bottom surface) of the original is continuously illuminated by the lamp 4. The light reflected by the original surface is incident on the movable optical system 3 kept at the home position, so that the light is imaged on the surface of the photosensitive member 230 through the optical system, during the execution of the copying process by the copying machine A. Thus, the exposure of the photosensitive member 230 to the image light of the original is effected in the form of reading a moving original.

(11) The original continues advancing so that its trailing edge passes through the original illumination station L and passes under the second pressing roller 29. When the fourth sheet sensor S4 detects the trailing edge of the original, the second motor M2 is stopped, by which the first and second original pressing rollers 28 and 29, the pairs 33 and 34 of the relaying rollers in the second sheet passage 14, are stopped. Even though the pairs 33 and 34 of the relaying rollers are stopped, the original does not stop, since the leading edge of the original, at this time, has been caught by the couple of discharging rollers 32 which are rotating at all times at the original discharging portion of the second sheet passage 14. The original discharged by the discharging rollers is stacked again on the stacking tray 10 with its information bearing surface facing up. Thus, the original is automatically placed above the uncopied originals O which are under the partition plate 36 (chain lines in FIG. 5). It is appreciated that the uncopied originals O and the copied originals O' are divided by the partition plate 36.

(12) When the leading edge of the original passed through the original illuminating station L is detected by the fourth sheet sensor S4, the electromagnetic clutch 49 is re-actuated, so that the sheet feeding mechanism 11 is operated again, to feed the next original.

(13) Simultaneously with the operation of the feeding mechanism 11, the clutch 50 is switched to its forward driving state so that the couple of rollers in the switch-back passage 26 rotate in the forward direction.

If the size of the original is large, it is possible that the trailing edge of the previous original has not yet passed through the couple of rollers 31, when the rotation of the couple of rollers 31 is switched. Since, however, the conveying force to the original exerted by the first and second original pressing rollers 28 and 29 which are pressed strongly to the platen glass extension 1a is larger than the conveying force in the forward direction exerted by the couple of rollers 31, the previous original continues to be stably advanced through the original illuminating station L.

(14) The original fed out as stated in the above paragraph (12) is introduced to the first sheet passage 12 in the same manner as the first original. Similarly, the original is relayed by the roller couple 30 and is introduced to the switch-back passage 26a and is then taken into the switch-back passage 26 by the couple of rollers 31 which have been switched to the forward driving state. Further, when the trailing edge of the original is detected by the first sheet sensor S1, the operation of the sheet feeding mechanism 11 is stopped by de-energizing the electromagnetic clutch 49. When the trailing edge of the original is detected by the second sheet sensor S2, the rotation of the roller couple 31 is switched to the backward rotation.

Here, it is stated that, if the trailing edge of the previous original has not yet passed through the roller couple 31 at the time of the leading edge of the second original reaching the roller couple 31 which is at that time rotating in the forward direction, the second original is driven toward the inside of the switch-back passage 26 by the forward rotation of the upper roller of the roller couple 31, while the first original is driven in the opposite direction by the conveying force exerted by the first and second original pressing rollers 28 and 29. Thus, the two originals are moved in the opposite directions with a slipping action therebetween. This is accomplished by using as the material of the roller couple 31 a high friction coefficient material, such as urethane rubber, so that the friction between the roller and the original is larger than that between the originals.

Also, if the trailing edge of the previous original has not yet passed by the fourth sheet sensor S4 at the time when the trailing edge of the second original reaches the second sensor S2, and the rotation of the roller couple 31 is to be reversed, the roller couple 31 is kept resting to keep the next original waiting in the passage 26, until the fourth sheet sensor S4 detects the trailing edge of the original. Upon the generation of the detection signal by the fourth sheet sensor S4, the roller couple 31 is rotated reversely. By doing so, the possible overlapping between the trailing edge portion of the first original and the leading edge portion of the second original, can be prevented.

(15) The second original discharged by the reversed rotation of the roller pair 31 from the switch-back passage 26, is advanced through the original illuminating station L and the second sheet passage 14 to the tray 10 in the same manner as described in the above paragraphs (8)–(11), so that the second original is copied.

(16) In the similar manner, the rest of the originals on the tray 10 are automatically fed out one by one from the bottom by automatically repeating the above steps (12)–(15). Those originals are finally returned to the tray 10. The copying machine A continuously effecting the copying operation for the sequentially supplied originals. When the set of the originals O are circulated once, one copy for each of the originals are provided.

(17) The mechanism for detecting the termination of the one circulation of the originals, as shown in FIGS. 4 and 5, operates in the manner described above to detect the termination of the one circulation by the sensor 71, when the trailing edge of the last original in the circulation passes under the partition plate 36. When the arms 35 and the partition plate 36 are rotated back to the home positions shown by chain lines in FIG. 5, the electromagnetic clutch 49 is rendered "off" to stop the operation of the sheet separating mechanism 11, so that they are kept at the home positions.

(18) If the number of copies to be taken is one, the first motor M1 is stopped when the last original is returned to the tray 10.

(19) If the number of copies to be taken is plural, the electromagnetic clutch 49 is rendered "on" by the second copy start signal, when the last original is returned to the tray 10. And, the steps described in the paragraphs (2)–(17) are automatically repeated the intended number of times so as to provide the intended number of copies for each of the originals.

The imaging optical system for illuminating the original at the original illumination station L and for forming an image thereof on the photosensitive member, has been described as being of such a type that the movable optical system 3 is kept at the home position and used for this purpose, but it is a possible alternative that an additional optical system which is stationary, exclusively for this purpose may be employed.

If the system is set to a duplex copying mode, that is, the mode wherein copied image is formed on both sides of a copy sheet, the operations are as follows.

Figure 1:
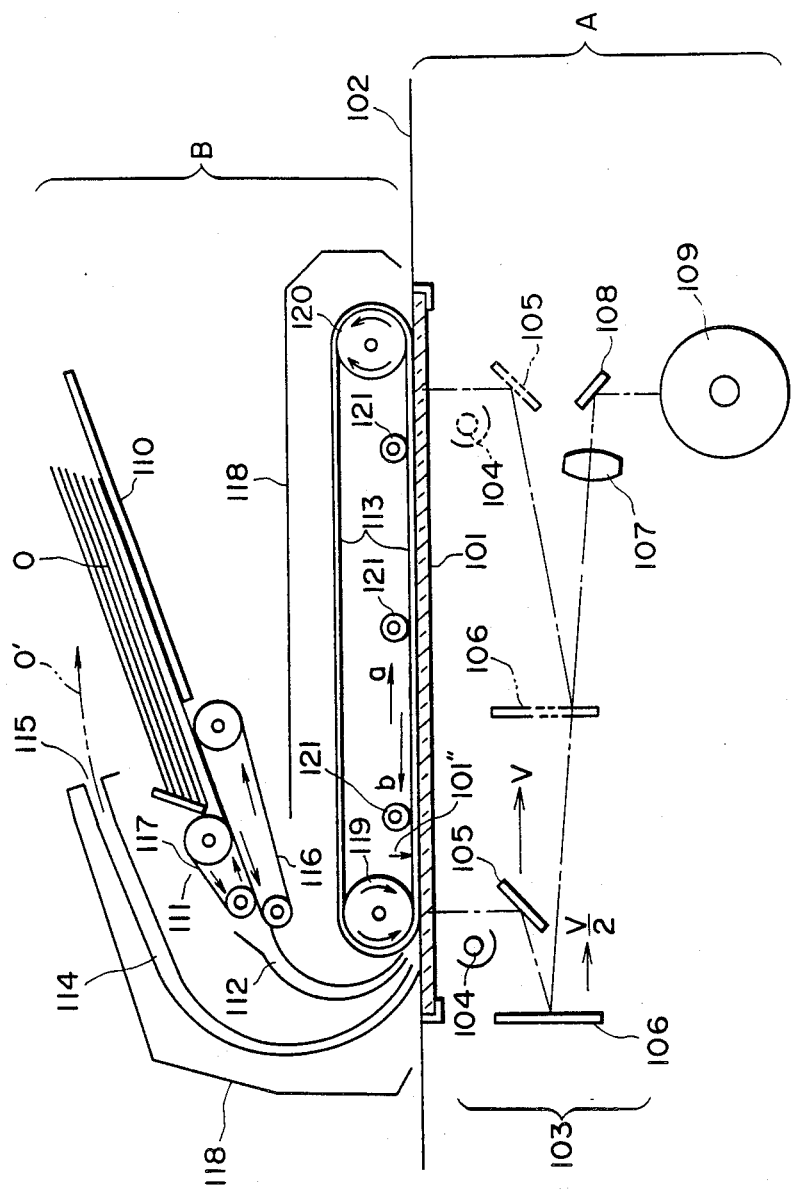
FIG. 1 is a schematical cross-section of an automatic document feeder of a circulation type.

It is assumed that the number of originals placed on the tray 10 is "n", which is an even number. As shown in FIG. 2-1, the bottommost original On is advanced to the platen glass extension 1a in the manner described above. The copy sheet, on which the image of the original On has been formed, is introduced to the intermediate tray 240, and simultaneously therewith, the original On is returned to the tray 10, while the next original On-1 is fed to the platen glass extension 1a, so that the originals On and On-1 are interchanged. The copy sheet discharged from the fixing rollers 239 and 239a is guided to the sheet passage IIIb and to the intermediate tray 240 by the guiding pawl 248 which has been pivoted counterclockwisely to take the position shown by the chain lines 248a.

Then, the original On-1 is not copied and simply discharged to the tray 10, whereafter the next original On-2 is advanced to the platen glass and copied. The copy sheet is similarly introduced to the intermediate tray 240, and simultaneously therewith, the next original On-3 is fed to the platen glass extension 1a, while the original On-2 discharged to the tray 10. If the original On-3 is the first page of the set of originals, the electromagnetic clutch 49 is de-energized by the rotation of the arm 35, and the copying machine A receives a cycle end signal from the document feeder B. By this, the copying machine discriminates that the number of originals is four, that is, an even number. As for the original On-3, no copying operation is effected, and it is simply exchanged with the original On, that is, the original On is advanced and set to the platen glass extension 1a. At that time, the originals and the copy sheets are in the states as shown in FIGS. 2-3A and 2-3B, respectively.

Next, the original On is skipped, and the original On-1 is fed to be placed on the platen glass extension 1a. The original On-1 is copied on the copy sheet fed out from the intermediate tray 240, that is, the bottommost copy sheet of the stack of the copy sheets each having one side bearing an image. Thus, on the side of the copy sheet opposite to the side, on which the image of the fourth page of the original is formed, an image of the original On-1, that is, the third page of the original, is formed. Then, the copy sheet is discharged to the discharge tray 246. Those operations are repeated so that the original On-2 is skipped, and the original On-3 is copied on the side of the copy sheet opposite to the side, on which the second page of the original has been copied, so that one set of duplex copies are discharged, as shown in FIG. 2-5. Those operations are repeated to obtain an intended number of copies. If the intended number is three, the state at the termination of the copy operation is as shown in FIG. 2-6 for the copy sheets and as shown in FIG. 2-1 for the originals.

Next, the explanation will be made with respect to the case where the number of originals is odd. In FIG. 2-2, the bottommost original On is copied, and the copy sheet is accommodated in the intermediate tray 240, as in the case of the even number originals. Then, the original On-1 is skipped, and the original On-2 is copied, and the copy sheet is conveyed to the intermediate tray 240. The next original On-3 is skipped, and the original On-4 is copied, and the copy sheet thereof is introduced to the intermediate tray 240. During the interchanging between the original On-3 and the original On-4, the copying machine A receives a cycle end signal from the document feeder B and discriminates that the number of originals is five, that is, an odd number. Then, the original On-4 is interchanged with the next original On by feeding the original On to the platen glass extension 1a. At that time, the states of the originals and the copy sheets are as shown in FIGS. 2-4A and 2-4B. Subsequently, the original On is skipped, and the next original On-1 is introduced. Simultaneously, the copy sheet on the intermediate tray 240, on which the fifth page of the original is copied, is introduced through the sheet passages VIb, IIb and IIIb onto the topmost copy sheet on the intermediate tray 240. Then, a copy image of the original On-1 is formed on the side of the copy sheet opposite to the side, on which the third page of the original has been copied. The copy sheet, similarly to the copy sheet of page 5, is introduced onto the topmost copy sheet on the intermediate tray 240. During this circulation, the original On-1 is replaced by the next original On-2 so that the original On-2 is placed on the platen glass extension 1a, but the original On-2 is skipped. An image of the original On-3 is formed on the side of the copy sheet opposite to the side, on which the first page of the original has been copied. The copy sheet is conveyed to the intermediate tray 240. The original On-4 is skipped. At that time, the copy sheets are as shown in FIG. 2-7. Then, the copy sheets on the intermediate tray 240 are sequentially fed out from the bottommost so that one set of duplex copies is discharged to the discharge tray 246 through the sheet passages VIb, IIb and VIIIb. Those operations are repeated to obtain an intended sets of copies are obtained. If the intended numbers is three, the final states of the copy sheets and the originals are as shown in FIG. 2-8 and FIG. 2-2, respectively.

When the copying mode is set to a simplex copy mode, the pawl 248 is fixed to the position shown by the solid lines (FIG. 2), whereby the simplex copy sheets are sequentially discharged to the discharge tray 246. It is appreciated that the copy sheets stacked on the discharge tray 246 are in the order of the pages of the original on the tray 10.

Figures 2, 3, 4, 5, 6:
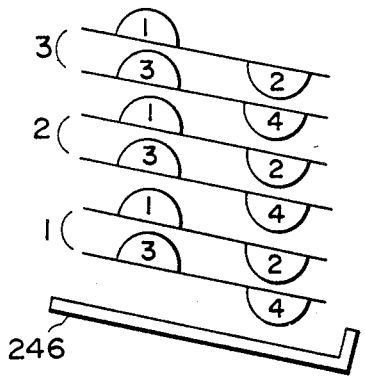

FIG. 6 is a block diagram for the electric circuits which control the document feeder B as shown in FIGS. 2 and 3.

The control system includes a copying machine controlling portion Q1 containing a microcomputer and a document feeder controlling portion Q2 containing a microcomputer, which has a known SLI including ROM, RAM, ALV, I/O latch and other elements.

The document feeder controller Q2 is provided with an interruption port IRPT, input ports AI0–AI3 and BI0–BI3 and output ports AO0–AO3, BO0–BO3 and CO0–CO3. A clockpulse detecting sensor CK detects a slit formed in a clock plate (not shown) which is rotated in synchronism with the first motor M1 by, for example, a photo-interrupter, it is effective to count the time required for an original to move between the original sensors S1–S4 in order, for example, to detect the jam of the originals. A switch DSW detects the opening and-/or closing of the document feeder, so that it can assist the discrimination whether the document feeder B is usable or not.

Designated by reference characters Q3A, Q3B, Q3C and Q3D are drivers constituted by transistors.

The START signal to be introduced into the inlet port BI3 is generated in the copying machine A in synchronism with the actuation of the copying machine. The START signal is high only when the document feeder is selected by the operating panel and when a READY signal is produced by the controller Q2. By the START signal, the operation of the document feeder RDF is started.

An OEND signal is produced at the output port BO0 when the circulation sensor 71 detects the one circulation of the originals. By this signal, the controller Q1 is able to control the number of copies.

The READY signal generated at the output port BO1 is effective to inform the copying machine A of the fact that the document feeder RDF is operable. This signal is produced when the switch DSW is closed and when originals are stacked on the document feeder and when there is no jam.

The signals SIZE1–SIZE4 produced at the output ports CO0–CO3 represent the sizes of the originals (A3, A4, B4 or the like) to be informed to the copying machine A. In response to those signals, the copying machine is set to the conditions under which the copy sheets can be selectively supplied. It is proper that the size of the original is detected by counting by the clock-pulses CK the time required for the original to pass by the original sensor S1 or S2.

The operation panel PANEL includes a document feeder selecting button, copy number setting button, copy start button, copy magnification setting button and others. The signals from those are introduced to the copying machine controller Q1 so as to control the copying machine A and the document feeder B.

Figures 2, 3, 4, 5, 6, 7:
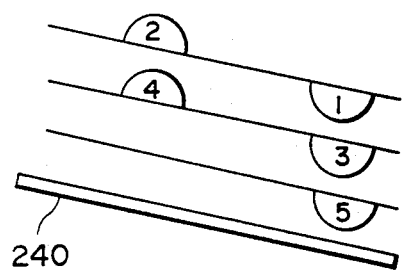

FIG. 7 is a schematic flow chart for showing the operation of the document feeder. When the copying machine A generates the START signal, the document feeder starts, upon which the first motor M1 and the electromagnetic clutches 49 and 51 are driven so that the bottommost original is fed out.

Next, when the first sensor detects the trailing edge of the original, the electromagnetic clutch 49 is energized, and the original is introduced into the switch-back passage 26. When the original sensor S2 at the inlet of the switch-back passage 26, detects the trailing edge of the original, the clutch 51 is de-energized to reverse the original in the switch-back circuit 26, if the previous original is not detected by the original detecting sensor S4. If the previous original is still detected by the original detecting sensor S4, the cluch 51 is deenergized after the previous original has passed by the sensor S4. After N clockpulses have passed after the actuation of the sensor S3, the second motor M2 is actuated to make a registration with the copying machine A.

After this, when the sensor S4 detects the original, the controlling sequence branches depending on the state of the START signal. If the START signal is still "ON", that is, the intended number of sets of copies are not completed, the sequence goes, at the time when the original has passed the sensor S4, to the execution of the program for stopping the second motor M1, while going back to (s), so that the same sequential operations are repeated.

If, on the other hand, the START signal is "OFF", that is, if the number of OEND signals produced by the document feeder is equal to the intended number of copies, the sequence goes back to (e) so that the operation of the document feeder is terminated, after the last original is discharged.

The foregoing descriptions are made with respect to the automatic original feeding mode. In the case where the originals are manually placed on the platen glass without the use of the document feeder, the entire document feeder B is pivoted with respect to the copying machine A so that the platen glass 1 is uncovered. The original to be copied is placed face down on the platen glass 1, and then the document feeder B is pivoted back to the platen glass so that the original pressing plate 22 covers the original. The original is sandwiched between the plate 22 and the platen glass 1. When the copy start button is depressed, the movable optical system 3 starts its reciprocating operation to scan optically the original to effect the copying operation.

As described above, according to this embodiment of the present invention, the original can be read or projected on the photosensitive member while it is transported through the original illumination station at the predetermined speed, and the original is transported back to the sheet tray, whereby both of the moving original reading system and the interchanging original supply system can be used, so that a high speed original processing can be effected. In spite of high speed operation, the conveying speed itself is not high so that the damage to the original can be prevented. Further, a mechanism for conveying the original to the platen glass 1 can be omitted, with the result of a simple construction. Simultaneously, it is most suitable when a smaller number of copies are to be obtained from a great number of originals. Also, since there is provided a covering plate, a book can be copied.

Figures 2, 3, 4, 5, 6, 7, 8:
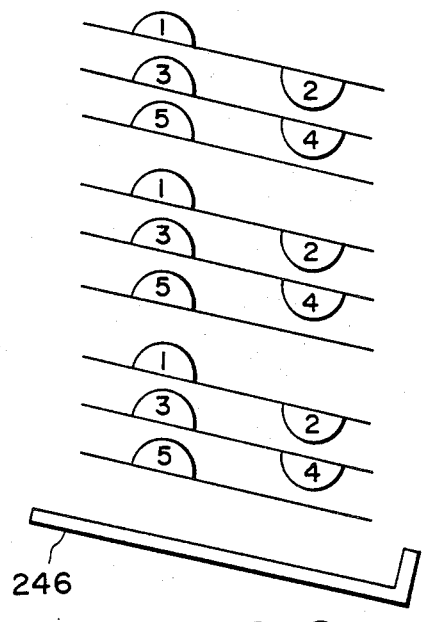
Figure 3:
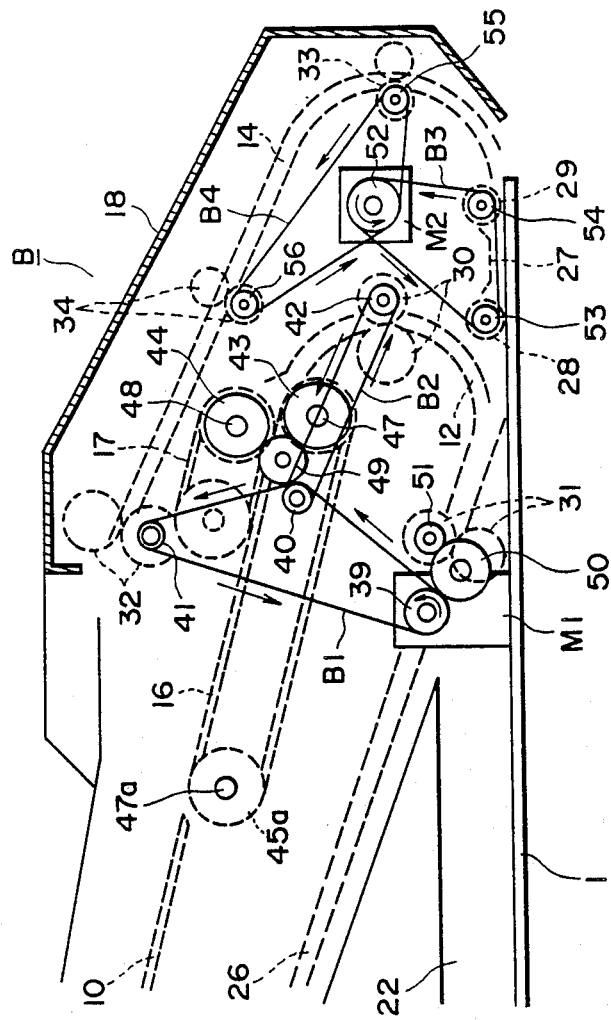
Figure 4:
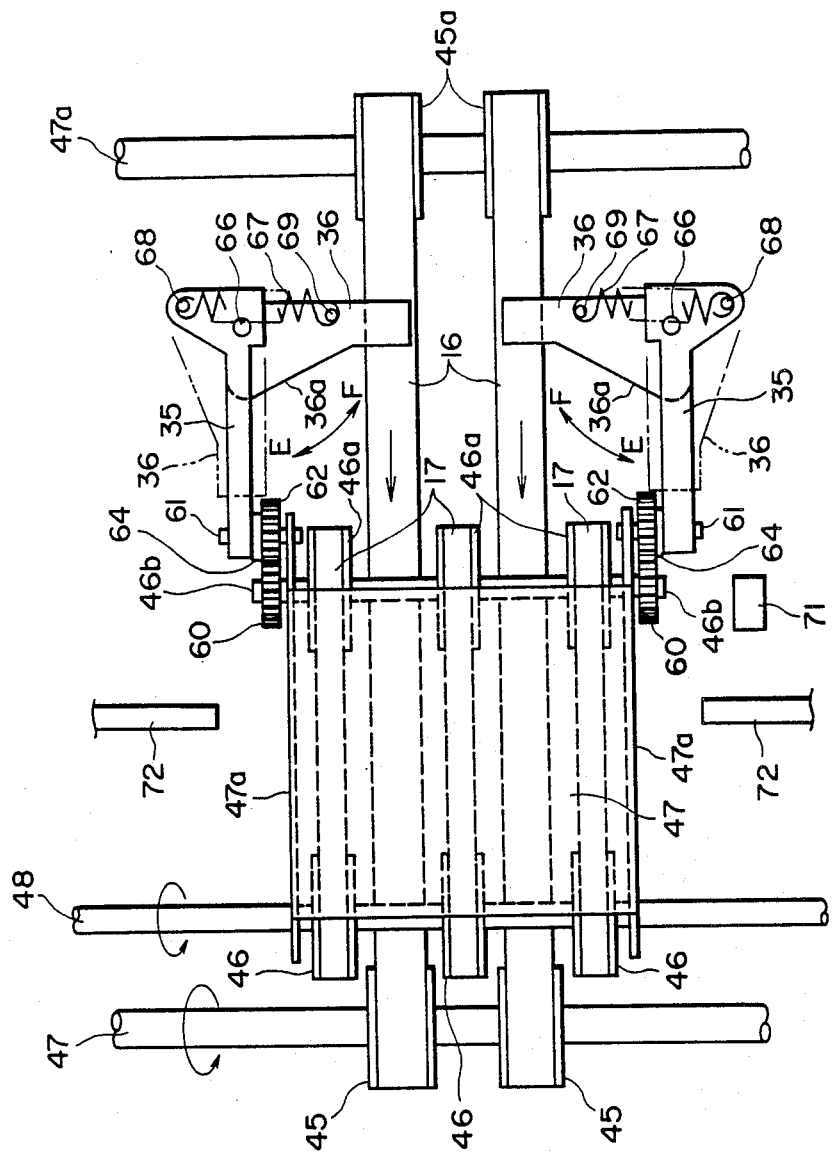
Figure 5:
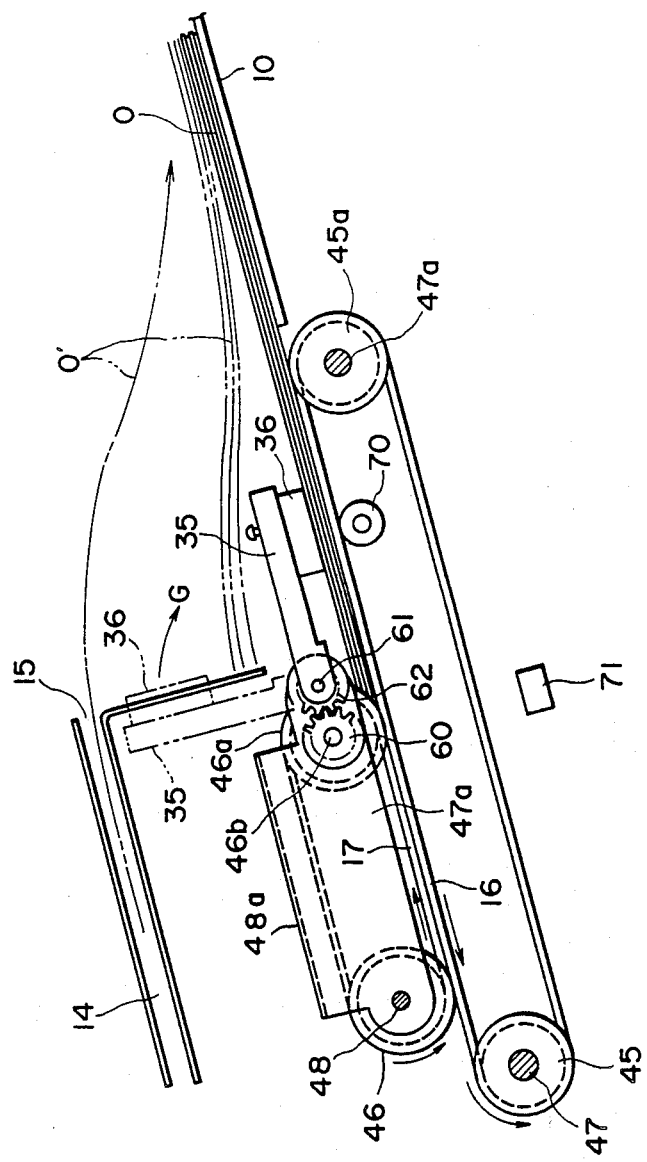
Figure 6:
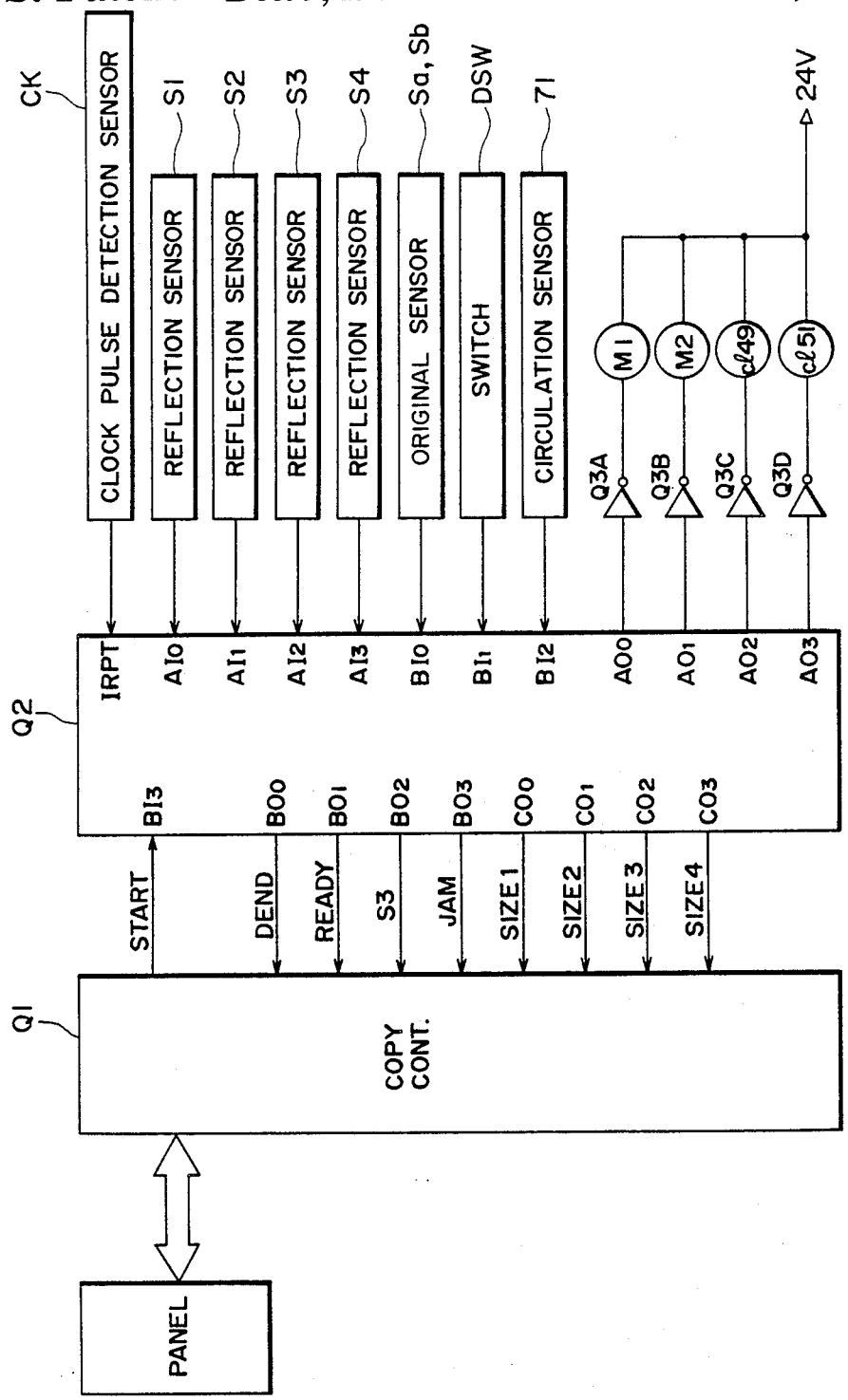
Figure 7B:
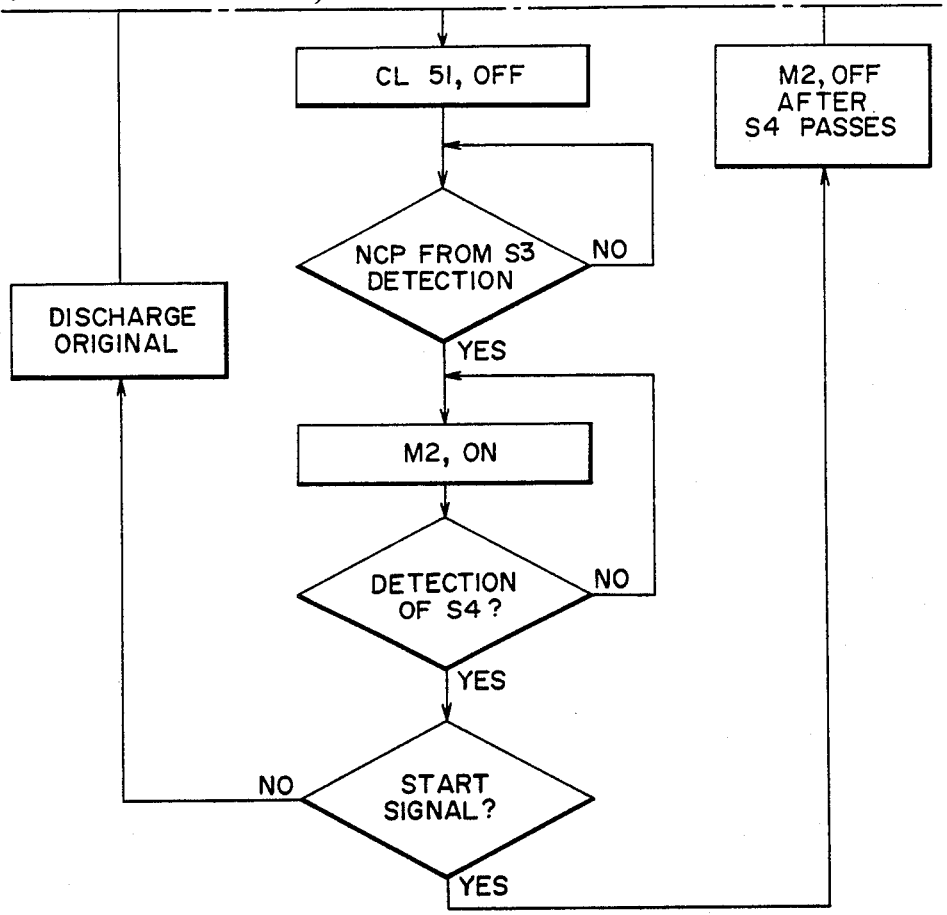
Figure 7:
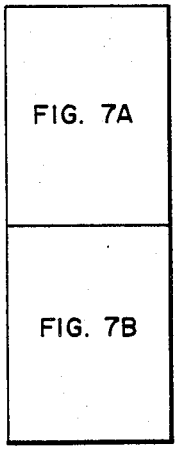
Figure 7A:
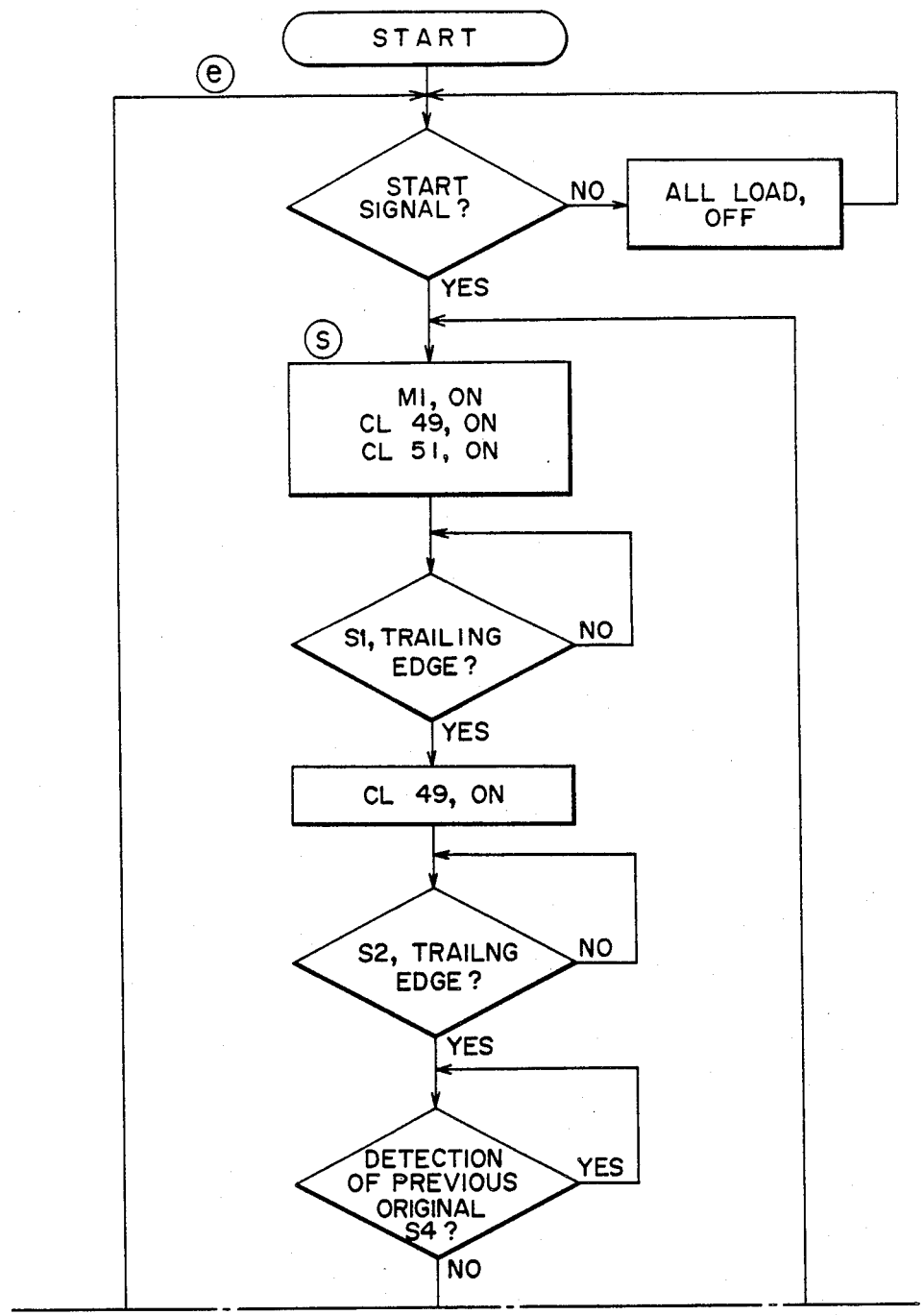
Figure 8B:
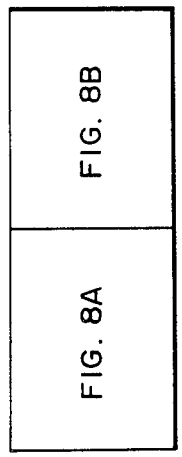
Figure 8B:
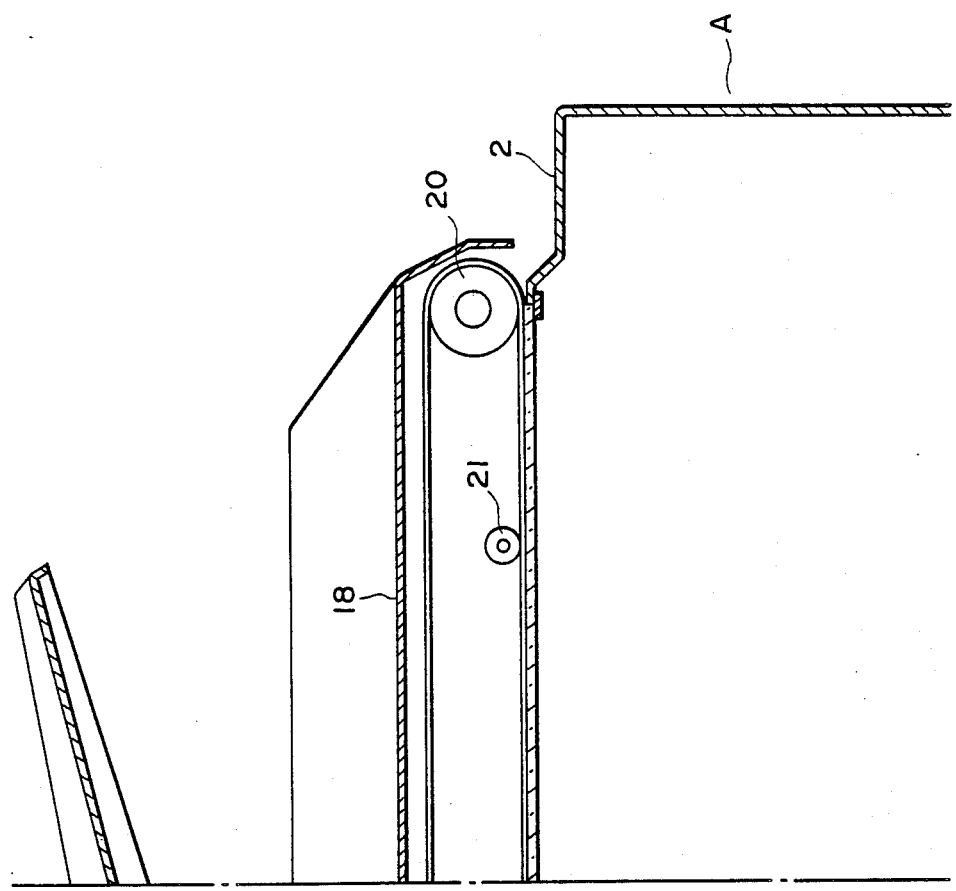
Figure 8A:
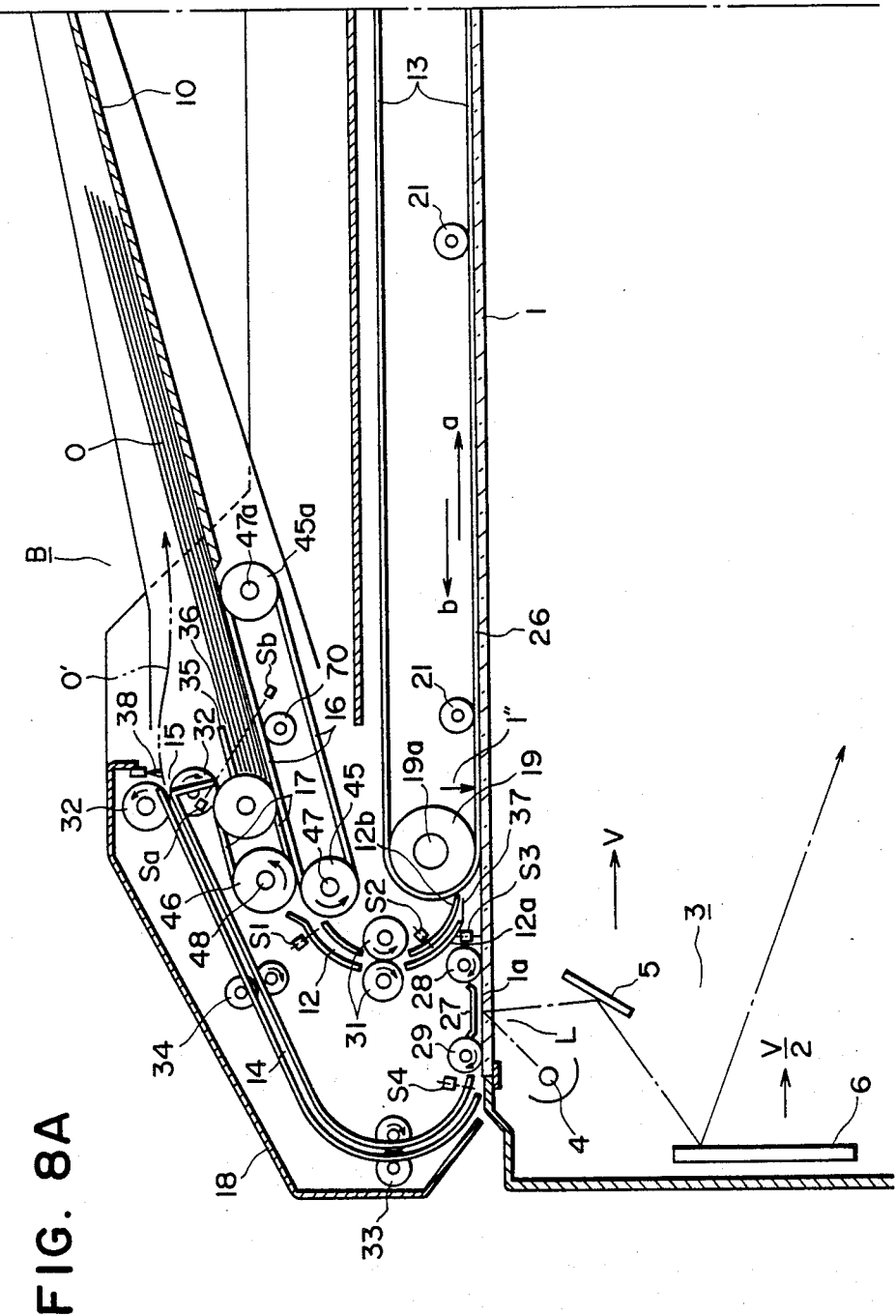
Figure 9:
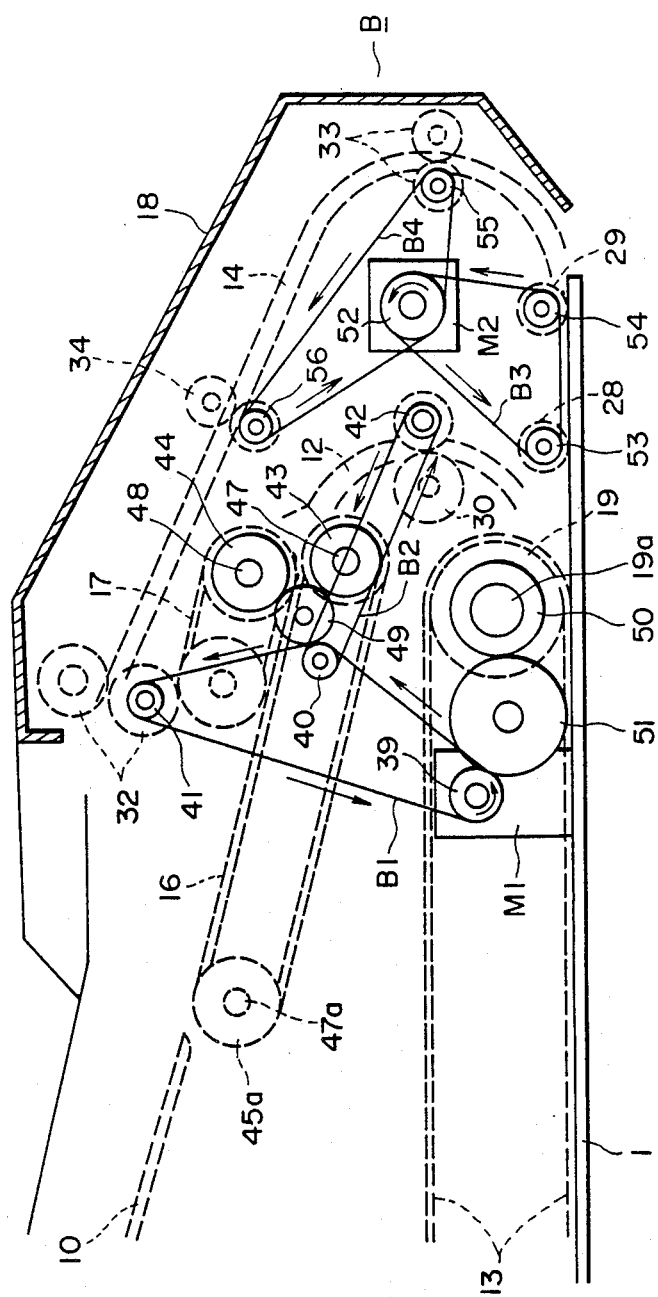
FIG. 9 is a side view of a driving mechanism.
Figure 10:
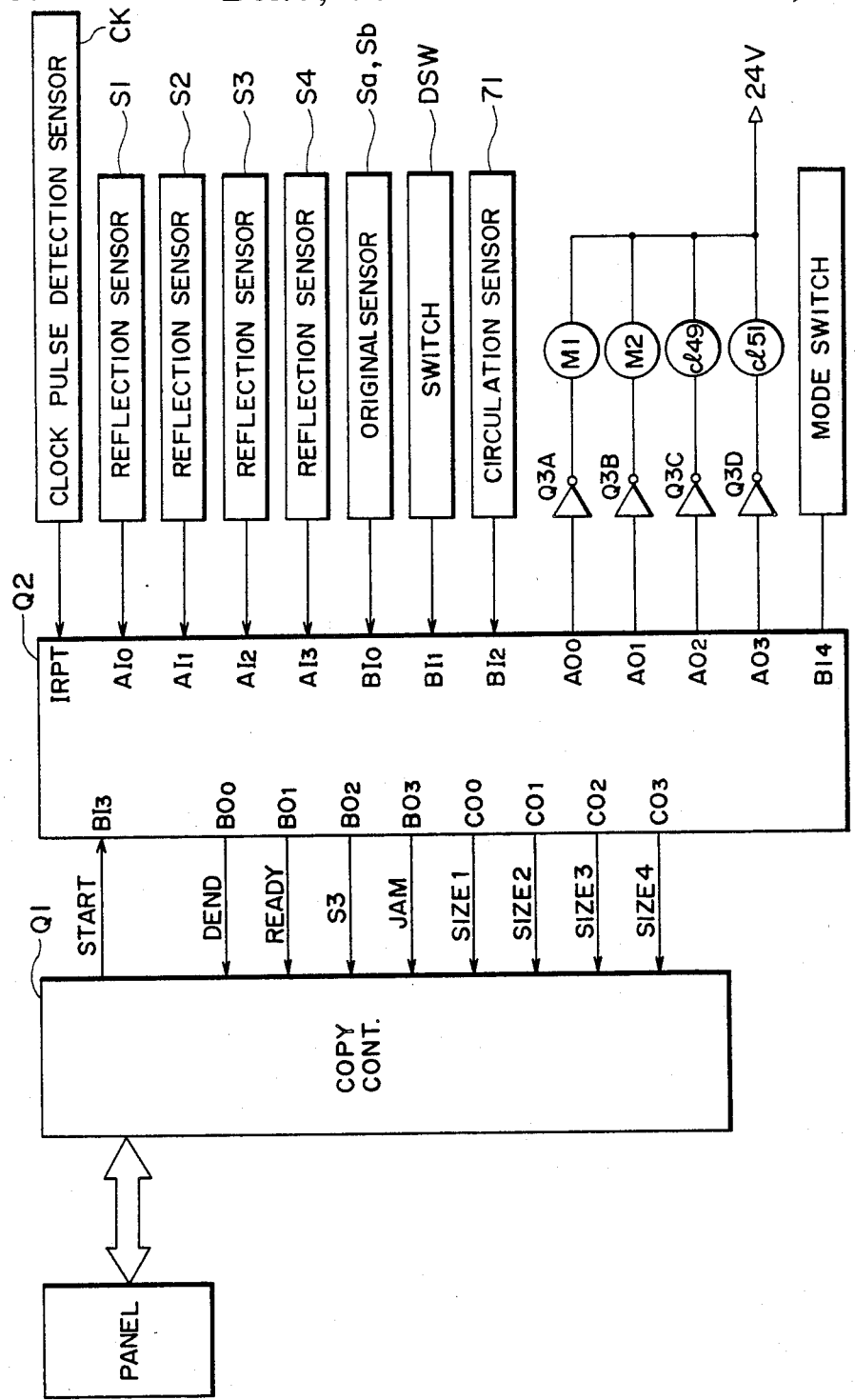
FIG. 10 is a block diagram of a controlling circuit for operating the apparatus in a first feeding mode.
Figure 11B:
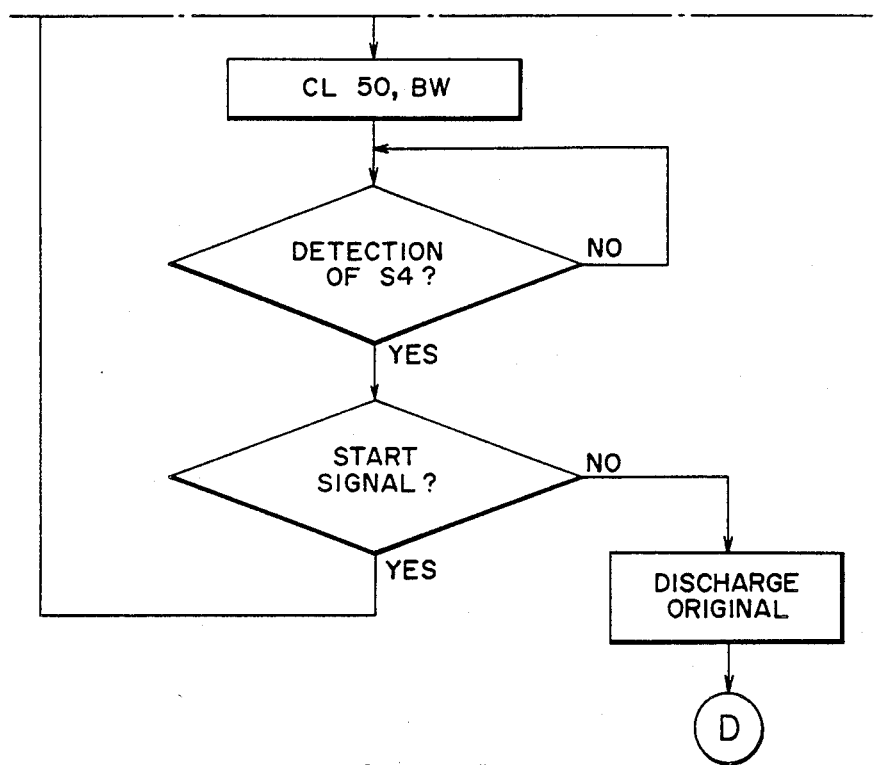
FIGS. 11, 11A, 11B and 12, 12A, 12B, 12C are flow charts for illustrating the operations.
Figure 11:
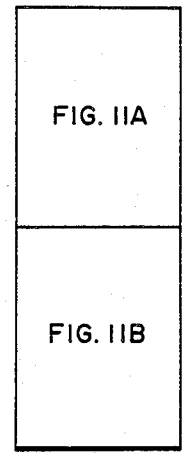
Figure 11A:
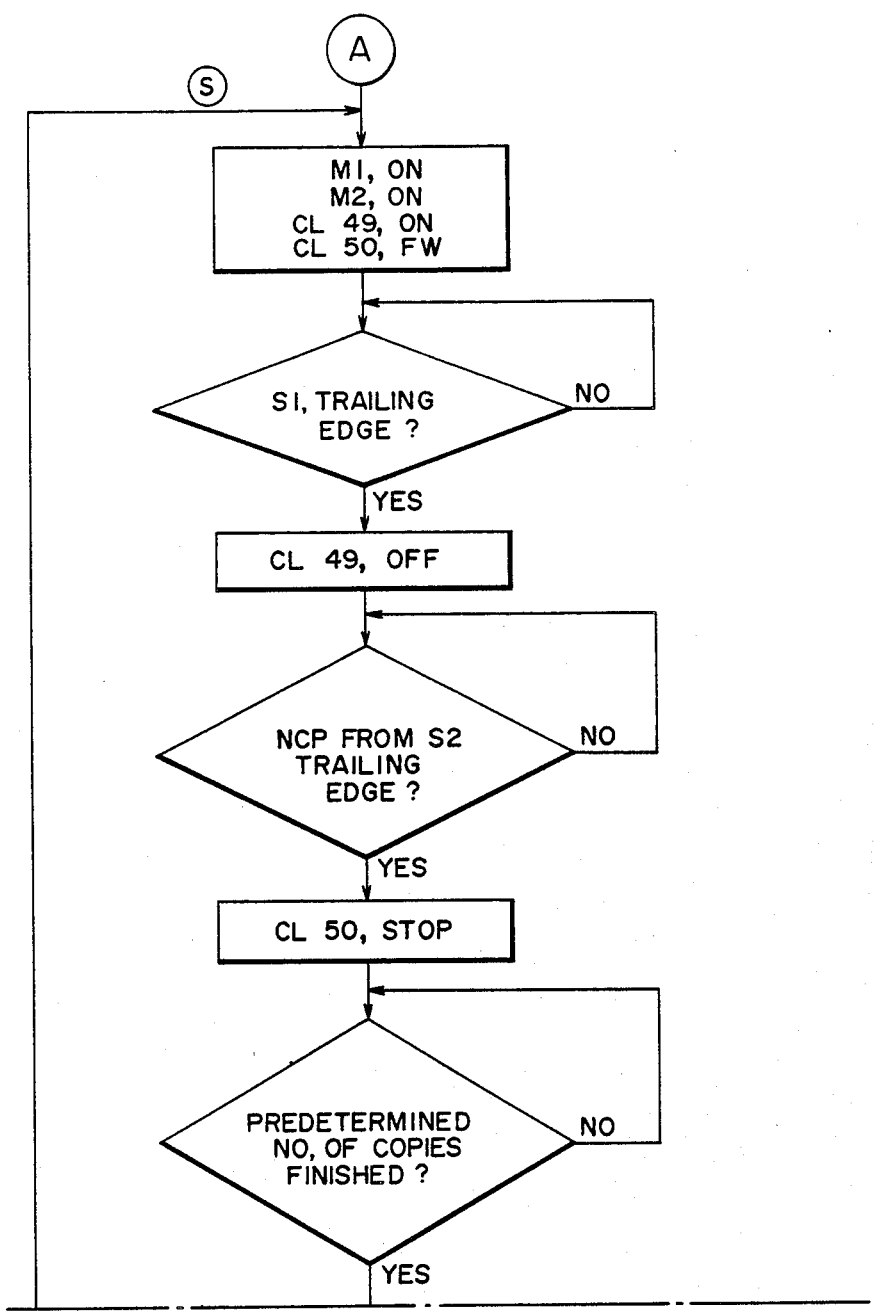
Figure 12C:
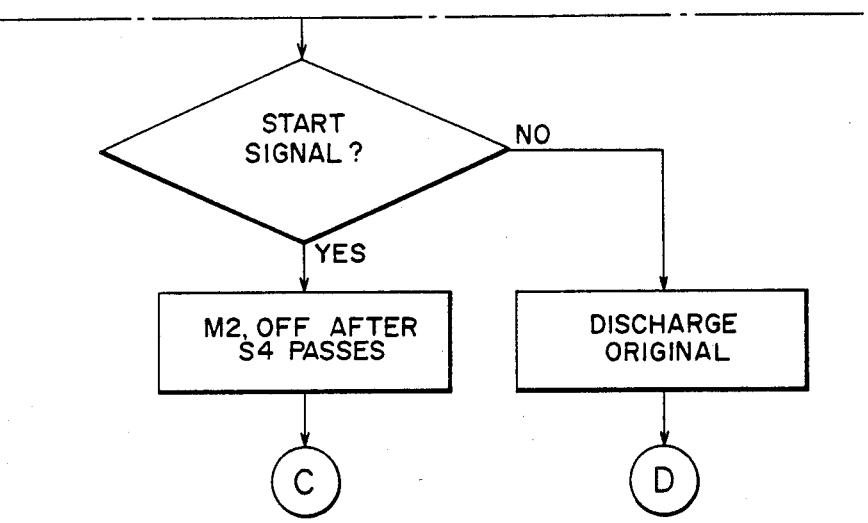
Figure 12:
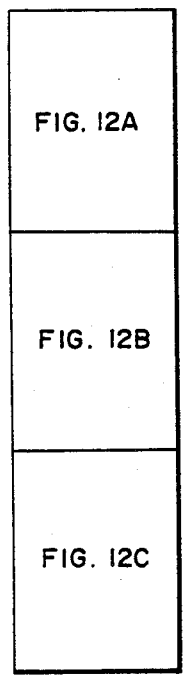
Figure 12A:
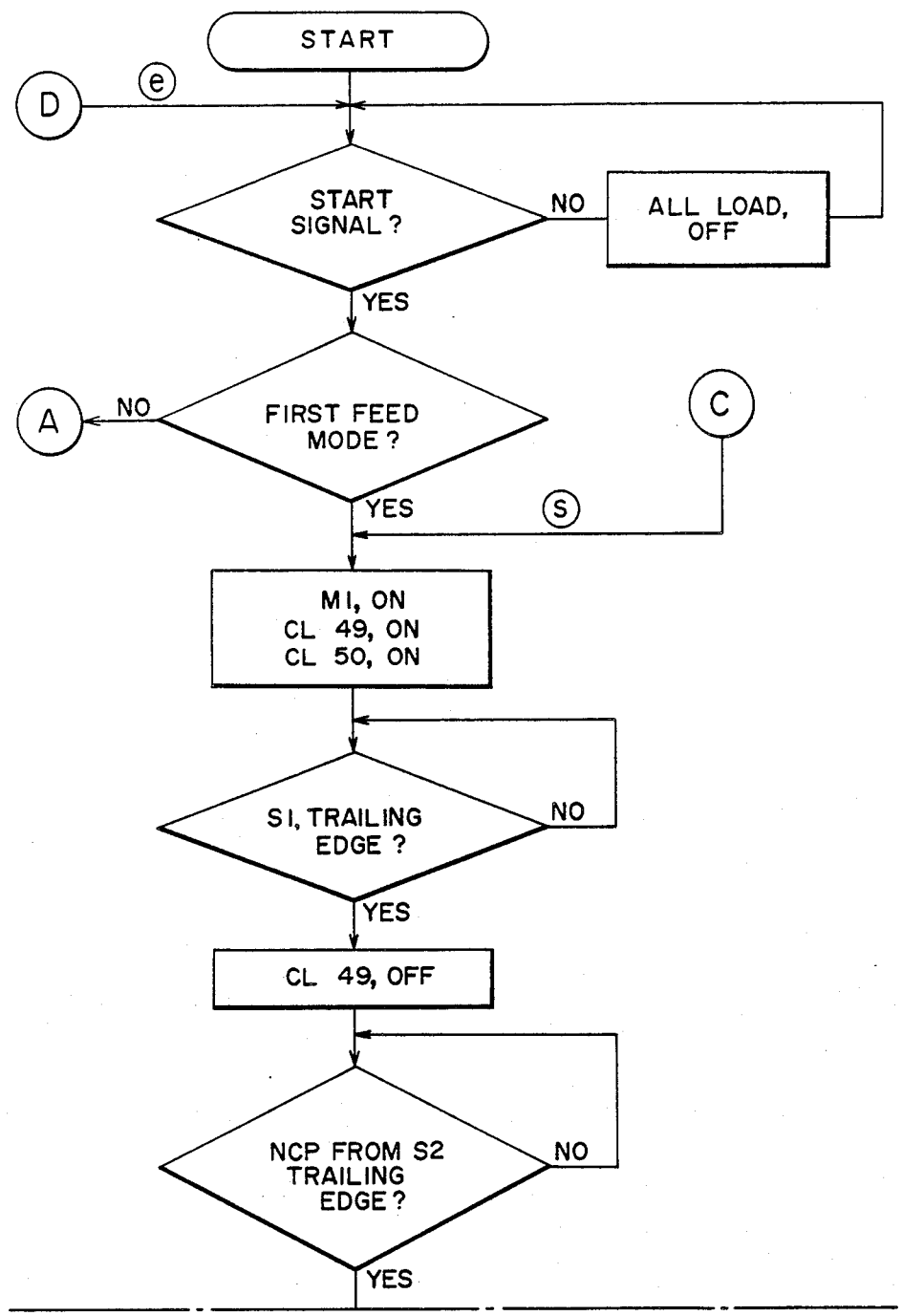
Figure 12B:
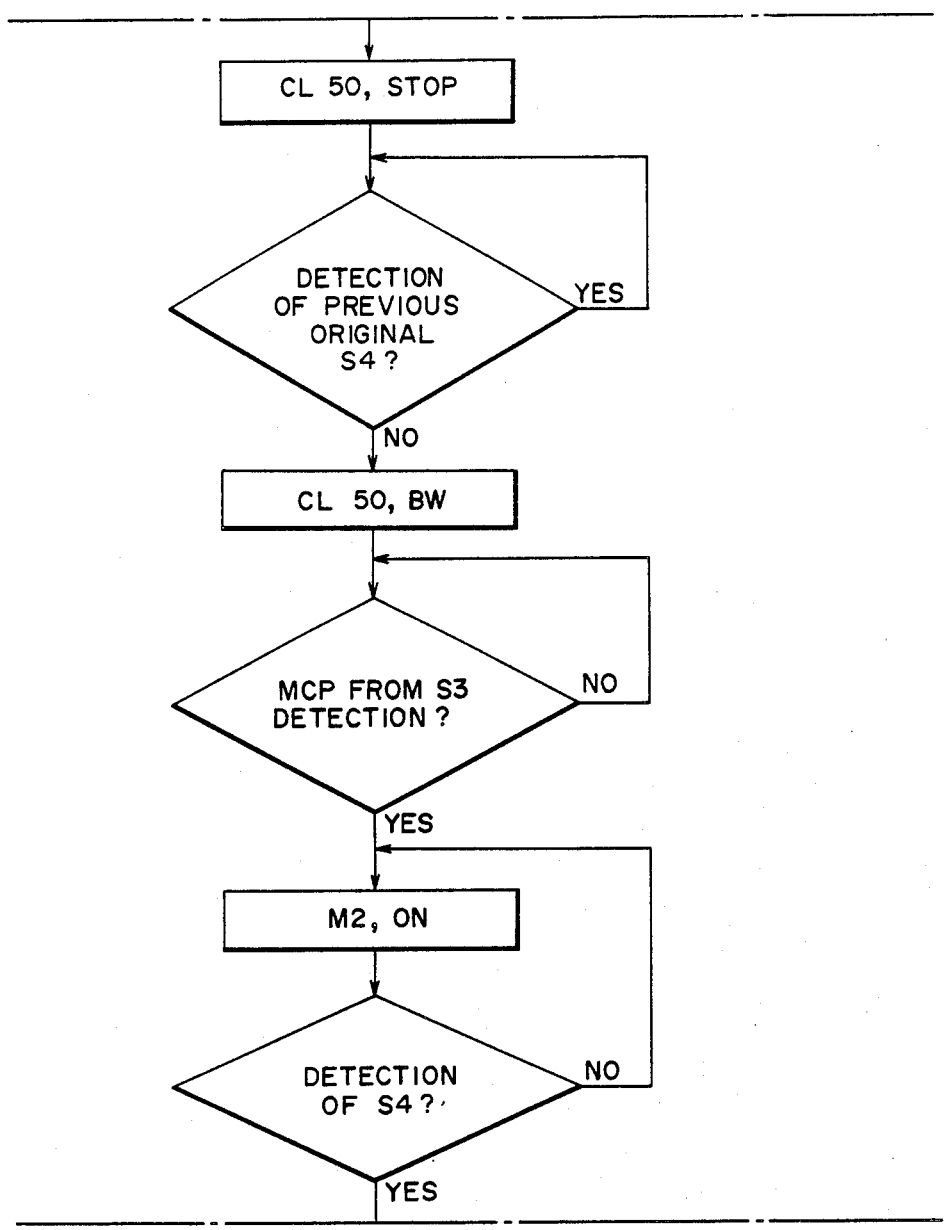

Another embodiment of the present invention will be described in conjunction with FIGS. 8 and 12. Since this embodiment is similar to the foregoing embodiment, except for the portions which will be described, the detailed description of the similar portions is omitted for the sake of simplicity by assigning the same reference numerals to the elements having the corresponding functions. FIG. 8 is a cross-sectional view of the document feeder constructed in accordance with the present invention. FIG. 9 is a cross-sectional view of a driving mechanism for the apparatus shown in FIG. 8. FIG. 10 is an electrical block diagram for the control of the apparatus. FIGS. 11 and 12 are flow charts showing the operation of the apparatus.

In this embodiment, the platen glass 1 is extended leftwardly in FIG. 8 beyond the left end part of the belt 13 which covers the substantial surface of the platen glass 1, to the neighborhood of the left-hand edge of the top panel 2, so as to form an extension 1a of the platen glass. The document feeder includes original sensors Sa and Sb for detecting the presence and/or absence of the original on the tray 10. Those sensors are of transparent type in this embodiment. It further includes reflection type sensors S1–S4, located at proper positions in the original transporting passage, for detecting the arrival and passage of the original. The first sensor S1 is disposed at the original inlet in the first sheet passage 12; the second sensor, next to the roller couple 30 in the first passage 12; the third sensor, before the first original pressing roller 28; and the fourth sensor, at the original inlet of the second passage 14. A deflector is provided to smoothly guide the original from the first passage 12 to between the left-hand end of the belt 13 and the platen glass 1 and to direct the original reversed from the platen glass 1 by the reversed rotation of the belt 13 toward the first original pressing roller 28 without feeding it back to the first sheet passage 12. For this purpose it is located at the outlet of the first passage 12.

In this embodiment, the portion of the platen glass 1 opposed to the flat face of the belt 13 constitutes a first original processing station, while the portion of the platen glass extension 1′a, to which the reflecting plate 27 is opposed, constitutes a second original processing station.

The driving mechanism shown in FIG. 9 is concentrated at the rear side of the document feeder of FIG. 8. The driving mechanism includes a first motor M1 and the second motor M2. The driving mechanism further includes a gear 50 fixed to a shaft 19a of the driving roller 19 for driving the belt 13, and an electromagnetic clutch for transmitting the rotational driving force of the first motor M1 to the gear 50 in the forward or backward direction. When the clutch 51 is kept at the forward driving state (energized) during the operation of the first motor M1, the belt 13 is driven in the forward direction, that is, the original is fed in the direction toward the right-hand end of the platen glass 1. When it is maintained at the reverse driving state (deenergized), the belt 13 rotates in the reverse direction, that is, the original is fed toward the left-hand end of the platen glass 1.

The operation of the document feeder B, in general, will be described. The document feeder B is operable in two modes, namely, the first mode wherein the original is processed at the second original processing station, that is, between the reflecting plate 27 and the platen glass extension 1′a opposing the reflecting plate 27 (the original illuminating station L), and the second mode wherein the original is processed at the first sheet processing station, that is, between the belt 13 and the platen glass 1 opposed thereto. The operation mode is selectable. The first operation mode will be described.

(1) The originals O to be processed are placed face up on the original stacking tray 10. By this, the optical path between the sensor elements Sa and Sb is blocked, so that the presence of the originals is detected. The operator sets on a control panel (not shown), a first automatic original feeding mode using the document feeder B, the number of copies to take, copying magnification and the other necessary copying conditions. Then, the operator depresses the copy start button.

(2) The first motor M1 of the driving mechanism (FIG. 3) first starts operating so as to rotate the sheet feeding rollers 30 in the first sheet passage 12 and the original discharging rollers 32 at the original outlet 15 of the second sheet passage 14. Further, the electromagnetic clutch 45 is energized, and the clutch 50 is kept in the forward driving position. Therefore, the sheet feeding belt 16 and the sheet separation belt 17 of the sheet feeding mechanism 11 start rotating, and simultaneously, the driving roller 19 for the belt 13 is rotated in the forward direction a. At this stage, the moving optical path 3 of the copying machine A is at its home position, while the lamp 4 is turned on.

(3) In synchronism with the start of rotation of the sheet separating belt 17 in the sheet feeding mechanism 11, the partition plate 36 is moved from its upright position in the clockwise direction to press the stack of originals O on the tray 10.

(4) The bottommost of the stacked originals O on the tray 10 is separated and fed by the cooperation of the sheet feeding belt 16 and the sheet separating belt 17.

(5) The original singled out by the mechanism 11 is guided to the first sheet passage 12, is relayed by the couple of feeding rollers 30 and then introduced into between the left-hand end of the belt 13 and the platen glass 1, so that the original which faces down is slided on the platen glass 1. The original feeding speeds of the rollers 30 and of the belt 13 are set to be about twice as much as the sheet feeding speed of the mechanism 11.

(6) When the first sheet sensor S1 detects the trailing edge of the original, the electromagnetic clutch 49 is disengaged, with the result that the operation of the sheet feeding mechanism 11 is once stopped.

(7) The original conveyed rightwardly on the platen glass 1 by the belt 13 rotating forwardly, is stopped by stopping the rotation of the belt 13, when the trailing edge of the original reaches the reference position 1″. The belt 13 is stopped by switching the clutch into a state for stopping the driving roller 19 when a timer interval has passed from an actuation of a timer, which is actuated when the second sheet sensor S2 detects the trailing edge of the original fed from the first passage 12 to between the platen glass 1 and the belt 13.

The clutch 50 is once switched to the position for stopping the belt driving roller 19, and immediately thereafter, is switched to and kept at the reverse driving position. The belt 13 is also reversed. By this reverse rotation of the belt 13, the original on the platen glass 1 is conveyed reversely toward the first original pressing roller 28 (switch-back transportation).

(8) The leading edge of the original thus switched back toward the first original pressing roller 28, passes by the third sheet sensor S3 and stopped by the nip formed between the platen glass extension 1a and the first original pressing roller 28, which rests at this time. The first original pressing roller 28, together with the second original pressing roller 29 and the relaying rollers 33 and 34 in the second sheet passage 14, starts rotating by the second motor M2 of the driving mechanism with the time delay preset by a timer from the detection of the leading edge of the original by the third sheet sensor S3. By one stopping the leading edge of the original by the roller 28 in this manner, the feeding of the original is synchronized with the sheet feeding at the side of the copying machine A.

(9) When the first original pressing roller 28 starts rotating, the original is introduced into the clearance (the second original processing station) formed between the reflecting plate 27 and the top face of the platen glass extension 1a, while being pressed on the platen glass extension 1a. The original is then pressed by the second original pressing roller 29. Thus, the original is moved with its surface press contacted on the top surface of the platen glass extension 1a by the rollers 28 and 29. Hereinafter, the area between the first and second original pressing rollers 28 and 29 will be called an "original illuminating station" L. The reverse rotation of the belt 13 stops by the clutch 50 being switched to a stopping position, when the rollers 28 and 29 and rollers 33 and 34 start to rotate. Despite the stop of the belt 13, the original continues to advance to the original illuminating station, since it has been caught by the nip formed between the first original pressing roller 28 and the platen glass extension 1a. The portion of the original which has passed through the original illuminating station L is introduced into the second sheet passage 14 and sequentially relayed by the pairs 33 and 34 of the relaying rollers, and is advanced toward the original discharging outlet 15. The speed, at which the original is advanced by the first and second original pressing rollers 28 and 29 and the pairs 33 and 34 of the relaying rollers, is set in synchronism with the peripheral speed of the photosensitive member 230 of the copying machine A.

(10) During the original passing through the original illuminating station L, the information bearing surface (bottom surface) of the original is continuously illuminated by the lamp 4. The light reflected by the original surface is incident on the movable optical system 3 kept at the home position, so that the light is imaged on the surface of the photosensitive member 230 through the optical system, during the execution of the copying process by the copying machine A. Thus, the exposure of the photosensitive member 230 to the image light of the original is effected in the form of reading a moving original, at the original illuminating station which functions as the second original processing station.

(11) The original continues advancing so that its trailing edge passes through the original illumination station L and passes under the second pressing roller 29. When the fourth sheet sensor S4 detects the trailing edge of the original, the second motor M2 is stopped, by which the first and second original pressing rollers 28 and 29, the pairs 33 and 34 of the relaying rollers in the second sheet passage 14, are stopped. Even though the pairs 33 and 34 of the relaying rollers are stopped, the original does not stop, since the leading edge of the original, at this time, has been caught by the couple of discharging rollers 32 which are rotating at all times at the original discharging portion of the second sheet passage 14. The original discharged by the couple of discharging rollers is stacked again on the stacking tray 10 with its information bearing surface facing up. Thus, the original is automatically placed above the uncopied originals O which are under the partition plate 36 (chain lines in FIG. 5). It is appreciated that the uncopied originals O and the copied originals O' are divided by the partition plate 36.

(12) When the leading edge of the original passed through the original illuminating station L is detected by the fourth sheet sensor S4, the electromagnetic clutch 49 is re-actuated, so that the sheet feeding mechanism 11 is operated again, to feed the next original.

(13) Simultaneously with the operation of the feeding mechanism 11, the clutch 50 is switched to its forward driving state so that the belt 13 is kept rotating in the forward direction.

If the size of the original is large, it is possible that the trailing edge of the previous and reversed original has not yet passed between the left-hand end of the belt 13 and the platen glass 1, when the rotation of the belt 13 is switched. Since, however, the conveying force to the original exerted by the first and second original pressing rollers 28 and 29 which are pressed strongly to the platen glass extension 1a is larger than the conveying-back force in the forward direction exerted by the belt 13 rotating forwardly, the previous original continues to be stably advanced through the original illuminating station L.

(14) The original fed out as stated in the above paragraph (12) is introduced to the first sheet passage 12 in the same manner as the first original. Similarly, the original is relayed by the roller couple 30 and is introduced to between the platen glass 1 and the belt 13 and is then advanced rightwardly on the platen glass 1 by the belt 13 which have been switched to the forward driving state. Further, when the trailing edge of the original is detected by the first sheet sensor S1, the operation of the sheet feeding mechanism 11 is stopped by de-energizing the electromagnetic clutch 49. When the trailing edge of the original is detected by the second sheet sensor S2, the rotation of the belt 13 is switched to the backward rotation.

Here, it is stated that, if the trailing edge of the previous original has not yet passed between the platen glass 1 and the belt 13 at the time of the leading edge of the second original reaching to the left-hand end of the belt 13 which is at that time rotating in the forward direction, the second original is driven rightwardly by the forward rotation of the belt 13, while the first original is driven in the opposite direction by the conveying force exerted by the first and second original pressing rollers 28 and 29. Thus, the two originals are moved in the opposite directions with a slipping action therebetween. This is accomplished by using as the material of the belt 13 a high friction coefficient material, such as urethane rubber, so that the friction between the belt 13 and the original is larger than that between the originals.

(15) Also, if the trailing edge of the previous original has not yet passed by the fourth sheet sensor S4 at the time when the trailing edge of the second original reaches the second sensor S2, and the rotation of the belt 13 is to be reversed, the belt 13 is kept resting to keep the next original waiting between the belt 13 and the platen glass 1, until the fourth sheet sensor S4 detects the trailing edge of the original. Upon the generation of the detection signal by the fourth sheet sensor S4, the belt 13 is rotated reversely. By doing so, the possible overlapping between the trailing edge portion of the first original and the leading edge portion of the second original, can be prevented.

(16) The second original discharged by the reversed rotation of the belt 13, is advanced through the original illuminating station L and the second sheet passage 14 to the tray 10 in the same manner as described in the above paragraphs (8)–(11), so that the second original is copied.

(17) In the similar manner, the rest of the originals on the tray 10 are automatically fed out one by one from the bottom by automatically repeating the above steps (12)–(16). Those originals are finally returned to the tray 10. The copying machine A continuously effecting the copying operation for the sequentially supplied originals in the form of reaching the moving original at the illuminating station as the second original processing station. When the set of the originals O are circulated once, one copy for each of the originals are provided.

(18) The mechanism for detecting the termination of the one circulation of the originals, as shown in FIGS. 4 and 5, operates in the manner described above to detect the termination of the one circulation by the sensor 71, when the trailing edge of the last original in the circulation passes under the partition plate 36. When the arms 35 and the partition plate 36 are rotated back to the home positions shown by chain lines in FIG. 5, the electromagnetic clutch 49 is rendered "off" to stop the operation of the sheet separating mechanism 11, so that they are kept at the home positions.

(19) If the number of copies to be taken is one, the first motor M1 is stopped when the last original is returned to the tray 10.

(20) If the number of copies to be taken is plural, the electromagnetic clutch 49 is rendered "on" by the second copy start signal, when the last original is returned to the tray 10. And, the steps described in the paragraphs (2)–(18) are automatically repeated the intended number of times so as to provide the intended number of copies for each of the originals.

The imaging optical system for illuminating the original at the original illumination station L and for forming an image thereof on the photosensitive member, has been described as being of such a type that the movable optical system 3 is kept at the home position and used for this purpose, but it is a possible alternative that an additional optical system which is stationary, exclusively for this purpose may be employed.

The second operation will now be described, in which the document feeder is operated as if it is an automatic document feeder.

(1) Similarly to the first operation mode, the originals O are set on the tray 10 as in paragraph (1). The operator actuates on the control panel to set the second automatic original feeding mode, the number of copies to be made, the copying magnification and the other copying conditions, and then the operator depresses the copy start button.

(2) Then, the processes described in the above paragraphs (2)–(7) are executed. Further, by the depression of the copy start button, the second motor M2 of the driving mechanism is placed in a continuously rotating state, with the result that the first and second original pressing rollers 28 and 29, the relaying roller pairs 33 and 34 in the second passage 14, are placed in the continuous forward rotation state. However, in the step described in paragraph (7), the belt 13 is not reversed immediately after the forward rotation thereof is stopped when the trailing edge of the original reaches the reference position 1". Rather, it is rested. Therefore, the original is kept at a fixedly set condition, wherein it is positioned at a predetermined position between the belt 13 and the platen glass 1, that is, at the first sheet processing station.

(3) When the forward rotation a of the belt 13 is stopped, the movable optical sytem 3 starts to be reversed in the copying machine A. By the movement of the optical system 3, the original faced down at the predetermined position between the platen glass 1 and the belt 13, that is, the first processing station, is optically scanned from its left-hand end to the right-hand end, and an image thereof is projected onto the surface of the photosensitive member. In other words, the exposure of the photosensitive member to the image of the original is effected at the platen glass 1, that is, the first original processing station, in the form of a fixed original exposing system.

(4) When the movable optical member 4, 5 and 6 move to the end, the lamp 4 is turned off, and simultaneously therewith, they are moved back toward their home positions and stop there. However, the number of copies set on the control panel is plural (multi-copy), the above described reciprocal operation of the movable optical system 3 is repeated to scan the original the intended number of times to executed multi-copy operation. The lamp 4 is "ON" during the forward movement, while it is "OFF" during the backward movement.

(5) Upon the termination of a single exposure operation (single copy) or the intended number of exposure operations (multi-copy) by the movable optical system 3 for the original placed on the platen glass 1, the clutch 50 is switched to rotate the belt 13 in the reverse direction. By this, the original on the platen glass 1 which has been copied is conveyed back to the left-hand end of the platen glass 1.

(6) The processed original being moved in the reverse direction, is advanced to the second sheet passage 14 without being processed at the second original processing station (the original illuminating station L) by the driving force exerted thereto from the first and second original pressing rollers 28 and 29 which are rotated in the forward direction. The original is then discharged by the roller pairs 33 and 34 and the discharging roller pair 32 onto the tray 10. At this time, the discharged original faces up and is stacked on the unprocessed originals on the tray 10.

(7) The feeding of the next original from the tray 10 to the platen glass 1 is executed in the manner similar to that described in the above paragraphs (12)–(14), so that the next original is placed at the predetermined position on the platen glass 1.

(8) The steps described in the foregoing paragraphs (3)–(6) are repeatedly executed for this original, that is, the original is optically scanned by the movable optical system 3 and discharged to the tray 10, so that the copying process is effected.

(9) The steps (7) and (8) are automatically repeated to automatically feed the originals from the bottom one by one and returned to the tray 10. During the repetition, the photosensitive member is exposed to the original at the first sheet processing station, that is, on the platen glass 1, once or the intended plural number of times, in the form of the fixed original exposing system, so that the single copy or multi-copy is executed for each of the original.

(10) In the case of the multi-copy, it is possible to further reduce the time required for the copy processing, by the exposure operation while the original is placed on the platen glass 1 is repeated (N−1) times (N: the intended number of copies), and producing one copy of each of the originals in the first mode, that is, feeding the originals re-stacked on the tray 10 once in the first mode. The switching of the document feeder B from the second mode to the first mode for this purpose may be manual or automatic.

Now, the manual setting mode wherein the originals are manually placed will be described.

When the original is to be manually placed without the use of the document feeder, the entire document feeder B is pivoted to raise it away from the platen glass 1 so as to open the platen glass 1, on which the original to be copied is then supported face down at the predetermined position. Subsequently, the document feeder B is pivoted back to cover the original. The original is now entirely covered by the belt 13 so that the original is sandwiched between the belt 13 and the platen glass 1. When the copy start button is depressed, the movable optical system 3 reciprocates to optically scan the original to effect the copying operation.

FIGS. 10 is a block diagram of the electric circuit to control the document feeder B shown in FIGS. 8 and 9.

The control system includes a copying machine controlling portion Q1 containing a microcomputer and a document feeder controlling portion Q2 containing a microcomputer, which has a known SLI including ROM, RAM, ALV, I/O latch and other elements.

The document feeder controller Q2 is provided with an interruption port IRPT, input ports AI0–AI3 and BI0–BI3 and output ports AO0–AO3, BO0–BO3 and CO0–CO3. A clockpulse detecting sensor CK detects a slit formed in a clock plate (not shown) which is rotated in synchronism with the first motor M1 by, for example, a photo-interrupter, it is effective to count the time required for an original to move between the original sensors S1–S4 in order, for example, to detect the jam of the originals. A switch DSW detects the opening and/or closing of the document feeder, so that it can assist the discrimination whether the document feeder B is usable or not.

Designated by reference characters Q3A, Q3B, Q3C and Q3D are drivers constituted by transistors.

The START signal to be introduced into the inlet port BI3 is generated in the copying machine A in synchronism with the actuation of the copying machine. The START signal is high only when the document feeder is selected by the operating panel and when a READY signal is produced by the controller Q2. By the START signal, the operation of the document feeder RDF is started.

The signal introduced into the inlet port BI4 determines the operation mode related from the two feeding modes of the document feeder B.

An OEND signal is produced at the output port BO0 when the circulation sensor 71 detects the one circulation of the originals. By this signal, the controller Q1 is able to control the number of copies.

The READY signal generated at the output port BO1 is effective to inform the copying machine A of the fact that the document feeder RDF is operable. This signal is produced when the switch DSW is closed and when originals are stacked on the document feeder and when there is no jam.

The signals SIZE1–SIZE4 produced at the output ports CO0–CO3 represent the sizes of the originals (A3, A4, B4 or the like) to be informed to the copying machine A. In response to those signals, the copying machine is set to the conditions under which the copy sheets can be selectively supplied. It is proper that the size of the original is detected by counting by the clockpulses CK the time required for the original to pass by the original sensor S1 or S2.

The operation panel PANEL includes a document feeder selecting button, copy number setting button, copy start button, copy magnification setting button and others. The signals from those are introduced to the copying machine controller Q1 so as to control the copying machine A and the document feeder B.

FIGS. 11–12 are schematic flow charts for showing the operation of the document feeder.

When the copying machine A generates the START signal, the document feeder starts, the first motor M1 and the electromagnetic clutches 49 are operated, and the clutch 50 takes the forward driving position, so that the bottommost original is fed out.

Next, when the first sensor detects the trailing edge of the original, the electromagnetic clutch 49 is de-energized so that the separating mechanism is stopped. During this, the original is introduced between the belt 13 and the platen glass 1. When the original sensor S2 detects the trailing edge of the original, and thereafter, N clockpulses have passed, the clutch 50 is switched to the stop position to stop the belt 13. At this time, if the previous original is not detected by the original detecting sensor S4, the clutch 50 is reversed to move the original in the reverse direction. If the previous original is still detected by the original detecting sensor S4, the cluch 50 is switched to the reverse driving after the previous original has passed by the sensor S4. After M clockpulses have passed after the actuation of the sensor S3, the second motor M2 is actuated to make a registration with the copying machine A.

After this, when the sensor S4 detects the original, the controlling sequence blanches, depending on the state of the START signal.

If the START signal is still "ON", that is, all sets of copies are not completed, the sequence goes back to ⓢ, so that the same sequential operations are repeated.

If, on the other hand, the START signal is "OFF", that is, all the originals have been copied, the sequence goes back to ⓔ, after the last original is discharged.

Next, in the second feeding mode, the original is fed by operating the first and second motors M1 and M2, energizing the clutch 49 and placing the clutch 50 in the forward driving state. By this, the originals are separated and fed from the bottom. Next, when the first sensor detects the trailing edge of the original, the clutch 49 is de-energized to stop the original separating mechanism. During this, the original is fed to between the belt 13 and the platen glass 1. When N clockpulses have past after the original sensor S2 detects the trailing edge of the original, the clutch 50 is placed into a rest position to stop the belt 13 so as to stop the original at a predetermined position on the platen 1. The original is optically scanned by the mirrors of the copying machine A the intended number of times, and then, the clutch 50 is reversed.

The following is a possible alternative. The second original processing station, that is, the original illuminating station L is located to the right-hand side of the original supporting platen glass 1. In the first supplying mode, the original singled out from the stack of the originals on the tray 10 is conveyed through the first passage 12 to the platen glass 1 in the rightward direction by the forward rotation of the belt 13. And then the original is conveyed through the original illuminating station L so that the original is read at the original illuminating station L while it is moving. The original passed through the original illuminating station L is returned onto the tray 10. In the second feeding mode, the forward rotation of the belt 13 is once stopped, and the original is optically scanned by the movable optical system 3, and thereafter, the belt 13 is again rotated in the forward direction to return the original by way of the right-hand end of the platen glass to the original stacking tray 10. As described in the foregoing, according to this embodiment of the present invention, the document feeder includes two original processing stations (the first and the second processing station), and is operable selectively in the first feeding mode wherein the original is scanned in the form of the moving original scanning fashion or system at one of the original processing stations or the second original feeding mode wherein the original is optically scanned in the form of the fixed original scanning fashion or system at the other original processing station, whereby the document feeder can be operated either in the moving original reading mode and in the original interchanging mode, so that a high speed original interchanging may be carried out. In spite of the high speed operation, the original feeding speed itself is relatively low, and therefore, the possible damage to the original can be prevented. Additionally, since an original may be supported on the platen glass, the apparatus is properly usable when a great number of copies are needed from a single original or when a great number of copies are required from a small number of originals.

A further embodiment will be described. Since this embodiment is similar to the previous embodiment, except for the portions which will be described, the detailed description of the similar portions is omitted for the sake of simplicity by assigning the same reference numerals to the elements having the corresponding functions. In this embodiment, the extension 1a of the platen glass 1 of FIG. 8 is omitted. The platen glass 1 for the scanning the fixed original is also used for scanning the original while the original is moving.

Figure 13B:
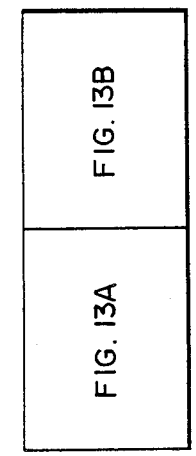
Figure 13B:
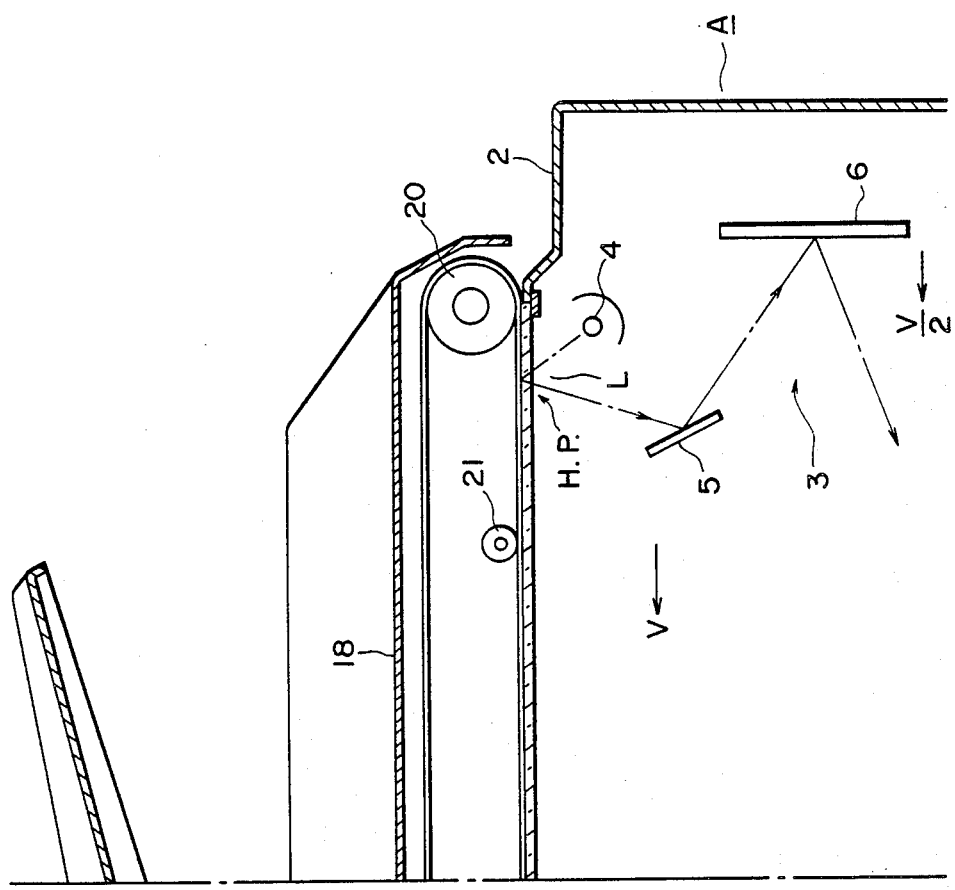
Figure 13A:
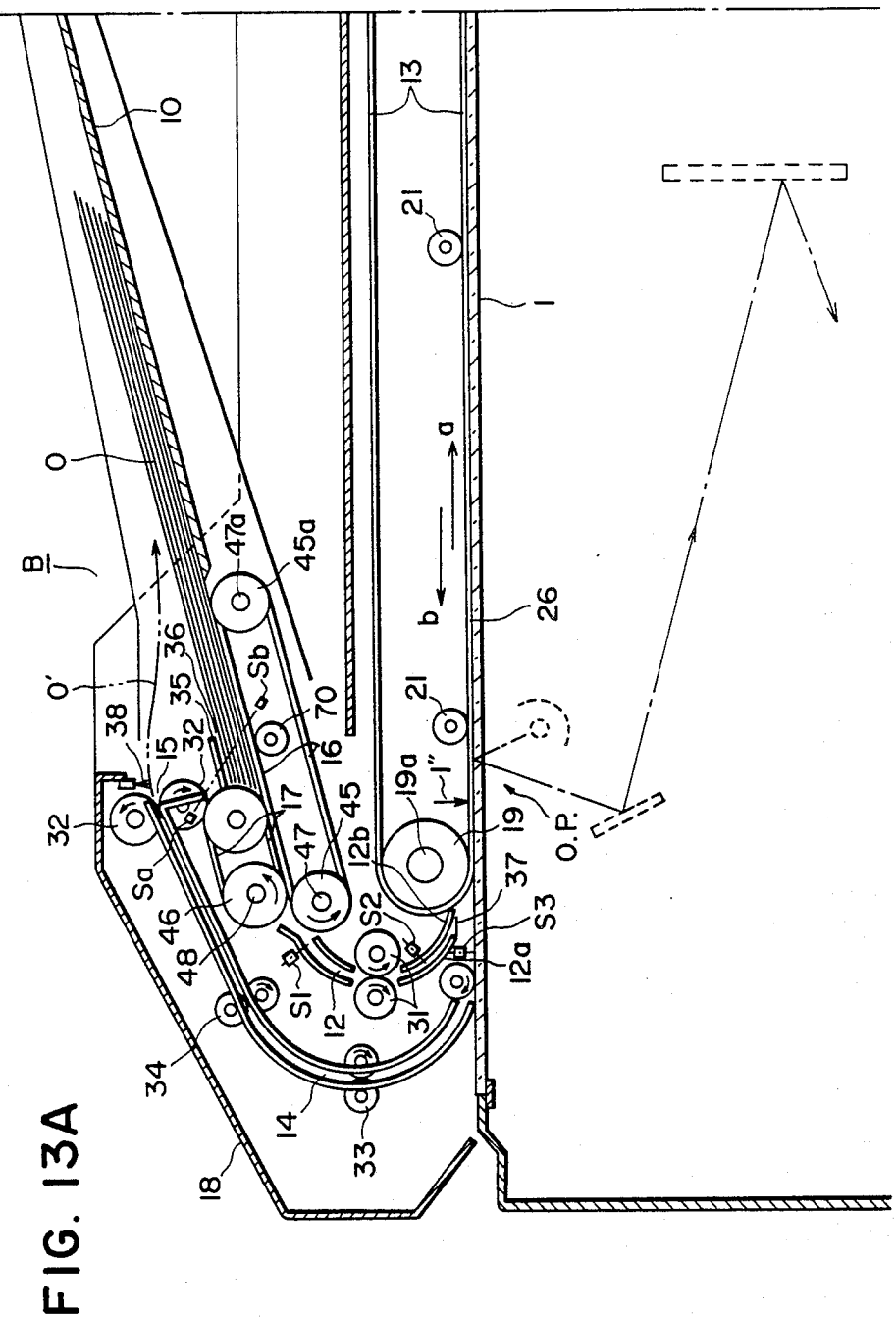

The home position HP of the exposure optical system 3 is disposed at the right-hand end of the platen glass 1, that is, opposite to the original entrance side. When the signal for feeding the original out of the stacking tray 10 is transmitted to the copying machine A, the optical system 3 moves leftwardly in FIG. 13B from the home position HP and is rested at a position corresponding to an end of the orignal feeding belt 13. When a predetermined time period has passed after the sensor S2 detects the leading edge of the original moving through the passage 12, the lamp 4 starts illuminating the original in synchronism therewith. The original is placed on the platen glass 1 with the faces upside-down and is moving to a predetermined position on the platen glass 1 by the rotation of the feeding belt 13. The moving original is illuminated by the lamp 4, and the light reflected by the original is introduced onto the photosensitive drum 230 by the optical system 3. After a predetermined time period has passed, which is determined on the basis of the size of the original, the lamp 4 is turned off, and the optical system 3 is returned to the home position HP without delay. Then, the optical system 3 optically scans the surface of the original bearing the information to be recorded, which is stationarily placed on the platen glass 1. If the number of the required copy is N (plural), the optical system 3 effects the optical scanning (N−1) times. After the required number of the scanning operation, the operations are returned to the stacking tray 10 through the sheet passage 14.

In this embodiment, it is a possible alternative that, when the original is discharging out of the platen glass 1, the moving original is scanned. In this case, the optical system 3 is rested at the home position HP. The original which has been passed through the passage 12 and stopped at a predetermined station on the platen glass 1, is optically scanned by the optical system 3 (N−1) times (N: the required number of copies). After the termination of the intended number of exposure operations, the optical system 3 is moved to the position OP which is in the neighborhood of the left-hand end of the platen glass and stops there. The optical system 3 scans the moving original which is going out of the platen glass 1 by the rotation of the belt. After the required number of scanning operations complete, the original is returned to the tray 10. When a single copy for each of the originals is required, the original is not stopped on the platen glass 1, as in the foregoing embodiment, rather, it is switched back and scanned by the optical system 3 which is rested at the position OP.

According to this embodiment of the present invention, the same platen glass portion is used both for the fixed original scanning and for the moving original scanning. In addition, during the moving original scanning mode, the feeding belt is able to keep the original press-contacted to the platen glass.

In the foregoing embodiment, the descriptions have been made with respect to the document feeder used with a duplex copying machine. However, the present invention is not limited to this case, but it is applicable to the document feeder used with a simplex copy machine. The present invention is advantageous particularly when, for example, simplex copies are obtained from simplex originals, or duplex copies are obtained from simplex copy. Also, the present invention is not limited to a copying machine, but is applicable to other image recording apparatus, such as a microfilm apparatus, facsimile apparatus and a printing apparatus.

While the invention has been described with reference to the structures disclosed herein, it is not confined to the details set forth and this application is intended to cover such modifications or changes as may come within the purposes of the improvements or the scope of the following claims.

What is claimed is:

1. An automatic sheet feeding apparatus, comprising: stacking means for stacking sheets thereon;
feeding means for feeding one by one the sheets stacked from said stacking means;
conveying means for conveying the sheets fed out of the sheet stacking means by said feeding means and reversing the face orientation of the sheets;
switch-back means for receiving sheets in a direction and stopping the sheets conveyed by said conveying means and sending the sheets back in an opposite direction;
returning means for returning to said sheet stacking means the sheets sent back by said switch-back means;
a first exposure station for scanning the sheets while they are moving, after the sheets are reversed in the face orientation but before the sheets are returned to the sheet stacking means by the returning means; and
a second exposure station for scanning the sheets while they are stationary by being stopped by said switch-back means.

2. An image recording apparatus, comprising: stacking means for stacking sheets thereon;
feeding means for feeding one by one the sheets stacked on said stacking means;
conveying means for conveying the sheets fed out of the sheet stacking means by said feeding means and reversing the face orientation of the sheets;
switch-back means for receiving sheets in a direction and stopping the sheets conveyed by said conveying means and sending the sheets back in an opposite direction;
returning means for returning to said sheet stacking means the sheets sent back by said switch-back means;
a first exposure station for scanning the sheets while they are moving, after the sheets are reversed in the face orientation but before they are returned to the sheet stacking means by the returning means;
a second exposure station for scanning the sheets while they are stationary by being stopped by said switch-back means;
image forming means for forming, on a material, images corresponding to the information on the sheets; and
feeding means for feeding the material to said image forming means.

3. An apparatus according to claim 1, wherein said first exposure station is disposed in the area of a platen glass for supporting the sheet.

4. An apparatus according to claim 1, wherein said first exposure station is located to an extension of a platen glass toward said returning means.

5. An apparatus according to claim 3, further comprising scanning means for scanning the sheets, said scanning means being stationary when the sheets are scanned at said first exposure station, and moving in a direction opposite to that of movement of the sheet being received by said switch-back means, when a sheet is scanned at said second exposure station.

6. An apparatus according to claim 4, further comprising scanning means for scanning the sheets, said scanning means moving in the same direction as that of movement of the sheet being received by said switch-back means, when a sheet is scanned at said second exposure station.

7. An apparatus according to claim 6, further comprising control means for feeding a subsequent sheet from the stack after a leading edge of the previous sheet reaches said first exposure station, and for retaining the subsequent sheet by preventing the reversing operation of said switch-back means until a trailing edge of the previous sheet passes through said first exposure station.

* * * * *

UNITED STATES PATENT AND TRADEMARK OFFICE
CERTIFICATE OF CORRECTION

PATENT NO.  : 4,627,709

DATED       : December 9, 1986

INVENTOR(S) : TADAYUKI KITAJIMA, ET AL.

Page 1 of 3

It is certified that error appears in the above-identified patent and that said Letters Patent is hereby corrected as shown below:

COLUMN 2, line 7, change "mechanismm" to --mechanism--.

COLUMN 3, line 37, change "Those measurements are, in effect is to" to --Those measurements, in effect,--

COLUMN 4, line 41, change "cross-sectinal" to --cross-sectional--.

COLUMN 5, line 65, change ":" to --;--;

line 67, change ":" to --;--;

line 68, change ":" to --;--.

COLUMN 6, line 7, change "conjuntion" to --conjunction--;

line 18, change "Myler" to --Mylar--;

line 54, change "Rdriven" to --driven--.

COLUMN 7, line 64, change "takes" to --take--.

COLUMN 8, line 13, change "clockwisely rotates" to --rotates clockwise--.

UNITED STATES PATENT AND TRADEMARK OFFICE
CERTIFICATE OF CORRECTION

PATENT NO. : 4,627,709

DATED : December 9, 1986

INVENTOR(S) : TADAYUKI KITAJIMA, ET AL.

It is certified that error appears in the above-identified patent and that said Letters Patent is hereby corrected as shown below:

COLUMN 9,
    line 4, delete "a";
    line 15, after "belt" insert --238--;
    line 18, change "temporally" to --temporarily--;
    line 25, change "40" to --240--.

COLUMN 10,
    line 38, change "passes" to --passage--;
    line 42, after "and" insert --is--.

COLUMN 13,
    line 27, change "counterclockwisely" to --counterclockwise--;
    line 59, delete ",".

COLUMN 14,
    line 24, delete ",";
    line 32, delete ",";
    line 41, change "to obtain an" to --until the--.

COLUMN 18,
    line 35, after "and" insert --is--.

COLUMN 21,
    line 62, change "executed" to --execute--.

COLUMN 22,
    line 60, change "FIGS." to --FIG.--.

UNITED STATES PATENT AND TRADEMARK OFFICE
CERTIFICATE OF CORRECTION

PATENT NO. : 4,627,709

DATED : December 9, 1986

INVENTOR(S) : TADAYUKI KITAJIMA, ET AL.

It is certified that error appears in the above-identified patent and that said Letters Patent is hereby corrected as shown below:

COLUMN 23, line 5, change "photo-interrupter, it" to --photo-interrupter. It--.

COLUMN 24, line 1, change "cluch" to --clutch--;

line 7, change "blanches" to --branches--;

line 24, change "past" to --passed--.

COLUMN 25, line 41, change "operation, the operations" to --operations, the originals--;

line 57, change "complete," to --is completed--.

Signed and Sealed this

Twenty-eighth Day of April, 1987

Attest:

DONALD J. QUIGG

*Attesting Officer*　　　　　*Commissioner of Patents and Trademarks*